US012774676B2

(12) United States Patent
Minas

(10) Patent No.: US 12,774,676 B2
(45) Date of Patent: Oct. 27, 2026

(54) HYDROGEN FUEL SYSTEM

(71) Applicant: General Electric Company, Schenectady, NY (US)

(72) Inventor: Constantinos Minas, Slingerlands, NY (US)

(73) Assignee: General Electric Company, Evendale, OH (US)

(*) Notice: Subject to any disclaimer, the term of this patent is extended or adjusted under 35 U.S.C. 154(b) by 251 days.

(21) Appl. No.: 17/901,357

(22) Filed: Sep. 1, 2022

(65) Prior Publication Data

US 2024/0401518 A1 Dec. 5, 2024

Related U.S. Application Data

(60) Provisional application No. 63/257,714, filed on Oct. 20, 2021.

(51) Int. Cl.
*F02C 3/22* (2006.01)
*F02C 7/224* (2006.01)
(Continued)

(52) U.S. Cl.
CPC ................ *F02C 3/22* (2013.01); *F02C 7/224* (2013.01); *F02C 7/236* (2013.01); *F02C 9/263* (2013.01);
(Continued)

(58) Field of Classification Search
CPC ... F02C 3/22; F05D 2240/36; F05D 2260/605
See application file for complete search history.

(56) References Cited

U.S. PATENT DOCUMENTS 2,984,978 A 5/1961 Griffith
3,236,449 A * 2/1966 Brunner ................. F23N 1/025 236/23
(Continued)

FOREIGN PATENT DOCUMENTS

CN 111963895 A 11/2020
DE 10021681 A1 11/2001
(Continued)

OTHER PUBLICATIONS

Hansen et al., "Aircraft Gas Turbine Engine Fuel Pumping Systems in the 21st Century", 96-GT-148, Transactions of the ASME, 1996, pp. 1-9. (Year: 1996).*
(Continued)

*Primary Examiner* — Lorne E Meade
(74) *Attorney, Agent, or Firm* — Hanley, Flight & Zimmerman, LLC

(57) ABSTRACT

A fuel system including: a liquid hydrogen fuel tank for holding a first portion of hydrogen fuel in a liquid phase; a gaseous hydrogen fuel tank for holding a second portion of hydrogen fuel in a gaseous phase; and a fuel delivery assembly including a liquid hydrogen delivery assembly in fluid communication with the liquid hydrogen fuel tank, the liquid hydrogen delivery assembly having a pump for pumping, in the liquid phase, the first portion of hydrogen fuel through the liquid hydrogen delivery assembly; a gaseous hydrogen delivery assembly in fluid communication with the gaseous hydrogen fuel tank, the gaseous hydrogen delivery assembly extending in a parallel arrangement with the liquid hydrogen delivery assembly; and a regulator assembly in fluid communication with both the liquid hydrogen delivery assembly and the gaseous hydrogen delivery assembly for providing gaseous hydrogen fuel to the engine when installed in the vehicle.

20 Claims, 10 Drawing Sheets

(51) Int. Cl.
*F02C 7/236* (2006.01)
*F02C 9/26* (2006.01)
*F02C 9/28* (2006.01)

(52) U.S. Cl.
CPC ............ *F02C 9/28* (2013.01); *F05D 2240/36* (2013.01); *F05D 2260/605* (2013.01)

(56) References Cited

U.S. PATENT DOCUMENTS

| | | | | |
|---|---|---|---|---|
| 5,548,962 | A | 8/1996 | Luger et al. | |
| 6,907,735 | B2 * | 6/2005 | Wolff | F01K 25/14 60/671 |
| 7,281,681 | B2 | 10/2007 | MacCready et al. | |
| 7,380,402 | B2 * | 6/2008 | Rebhan | F02C 3/22 60/776 |
| 7,399,166 | B2 * | 7/2008 | Uchino | F04C 14/08 417/220 |
| 7,574,856 | B2 * | 8/2009 | Mak | F01K 23/10 60/645 |
| 7,806,365 | B2 | 10/2010 | Miller et al. | |
| 7,810,669 | B2 | 10/2010 | Westenberger | |
| 8,950,195 | B2 | 2/2015 | Watts | |
| 11,267,580 | B2 * | 3/2022 | Mastrocola | F02C 7/236 |
| 11,668,243 | B2 * | 6/2023 | Muldoon | F02C 7/262 60/736 |
| 11,808,204 | B2 * | 11/2023 | Lambert | F02C 3/22 |
| 2017/0237093 | A1 | 8/2017 | DeWald et al. | |
| 2017/0291486 | A1 | 10/2017 | Tanaka et al. | |
| 2020/0370708 | A1 | 11/2020 | Kim et al. | |
| 2022/0090538 | A1 * | 3/2022 | Carrow | F02C 9/40 |
| 2022/0145801 | A1 * | 5/2022 | McCurdy Gibson | F02C 3/22 |
| 2022/0381185 | A1 * | 12/2022 | Muldoon | F02C 7/32 |
| 2023/0036266 | A1 * | 2/2023 | Xuening | F02C 7/232 |

FOREIGN PATENT DOCUMENTS

| | | | | |
|---|---|---|---|---|
| DE | 102019122227 | A1 | 2/2021 | |
| EP | 3048281 | A1 | 7/2016 | |
| FR | 2615903 | A1 | 12/1988 | |
| GB | 2578106 | A * | 4/2020 | F02C 7/22 |

OTHER PUBLICATIONS

China National Intellectual Property Administration, “The First Office Action,” issued in connection with Chinese Patent Application No. 202211273027.9, dated Mar. 31, 2026, 21 pages. [English Translation Included].

* cited by examiner

HYDROGEN FUEL SYSTEM

CROSS-REFERENCE TO RELATED APPLICATIONS

This application is a non-provisional application claiming the benefit of priority to U.S. Provisional Application No. 63/257,714, filed Oct. 20, 2021, which is hereby incorporated by reference in its entirety.

FIELD

The present subject matter relates generally to hydrogen fuel system for a vehicle, such as a hydrogen fuel system for an aeronautical vehicle.

BACKGROUND

A conventional commercial aircraft generally includes a fuselage, a pair of wings, and a propulsion system that provides thrust. The propulsion system typically includes one or more aircraft engines, such as turbofan jet engines. The aircraft engine(s) may be typically mounted to a respective one of the wings of the aircraft, such as in a suspended position beneath the wing.

The aircraft further includes a fuel delivery assembly that generally includes a fuel tank and one or more fuel lines that extend between the fuel tank and the aircraft engine(s). Traditional aircraft engines are powered by aviation turbine fuel, which is typically a combustible hydrocarbon liquid fuel, such as a Kerosene-type fuel, having a desired carbon number. The aviation turbine fuel is a relatively power-dense fuel that is relatively easy to transport and stays in a liquid phase through most ambient operating conditions for aircraft.

It has been argued that improvements in emissions from conventional aircraft having aircraft engines powered by aviation turbine fuel may be achieved by utilizing a hydrogen fuel. Hydrogen fuel is not a relatively power-dense fuel in its gaseous form and in liquid form has an extremely low boiling point.

The inventors of the present disclosure have found that these and other issues may make it difficult to effectively use hydrogen fuel for aircraft engines. Accordingly, technological improvements facilitating use of hydrogen fuel in aircraft engines in view of these and other issues would be welcomed.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
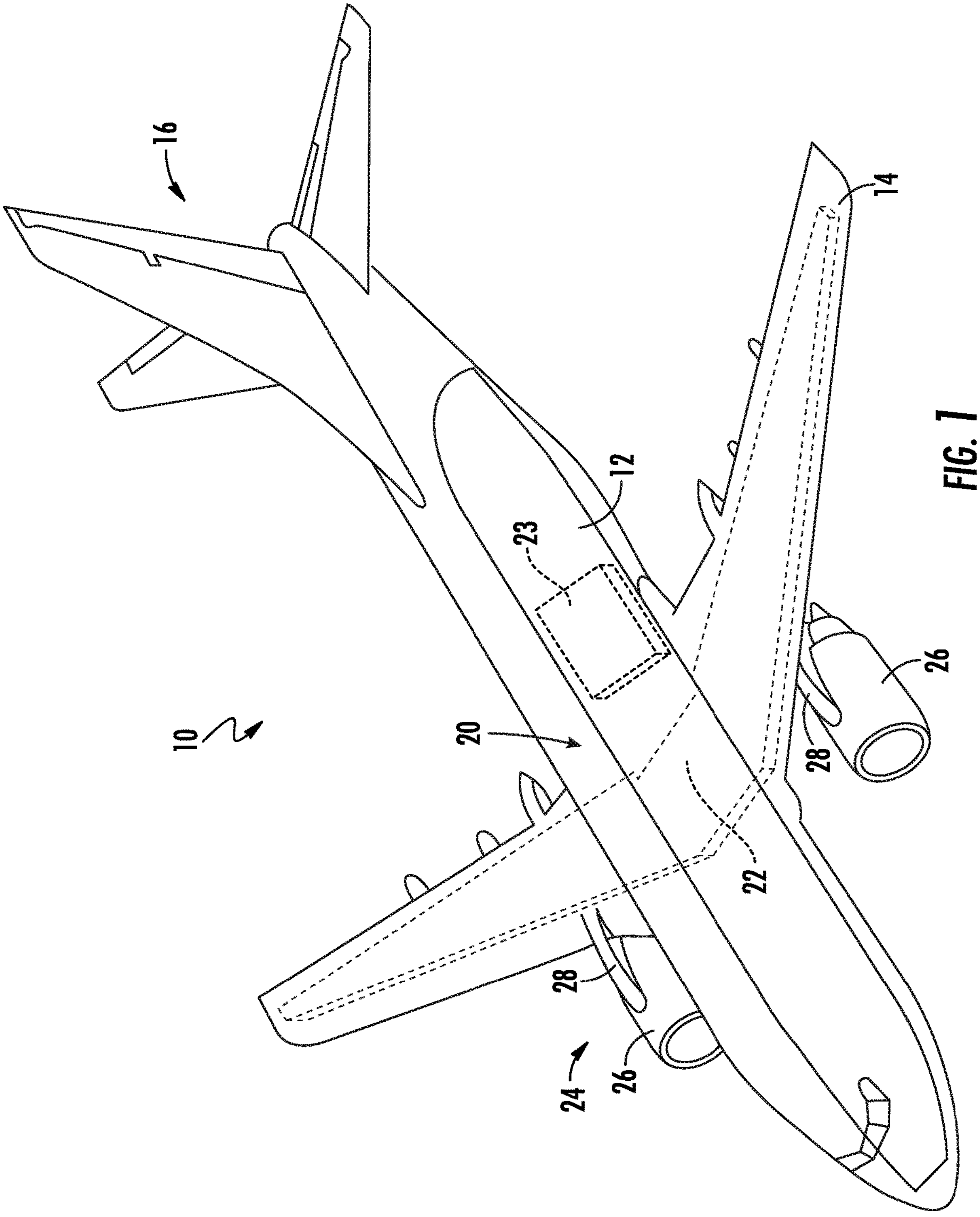
FIG. 1 is a schematic view of an aircraft having a fuel system in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" refers only A, only B, only C, or any combination of A, B, and C.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine.

In certain exemplary aspects of the present disclosure, a fuel system for a vehicle having an engine is provided. The fuel system may generally include a liquid hydrogen fuel tank and a gaseous hydrogen fuel tank. The fuel system may further include a fuel delivery assembly. The fuel delivery assembly may have a liquid hydrogen delivery assembly in fluid communication with the liquid hydrogen fuel tank and a gaseous hydrogen delivery assembly in fluid communication with the gaseous hydrogen fuel tank. The gaseous hydrogen delivery assembly may extend generally in a parallel flow arrangement with the liquid hydrogen delivery assembly. The fuel delivery assembly may further include a regulator assembly in fluid communication with both the liquid hydrogen delivery assembly and the gaseous hydrogen delivery assembly for providing gaseous hydrogen fuel to the engine when installed in the vehicle.

In certain exemplary aspects, the liquid hydrogen delivery assembly may generally include a pump for providing (e.g., pumping) a first portion of hydrogen fuel in a liquid phase through the liquid hydrogen delivery assembly. The liquid hydrogen delivery assembly may further include a heat exchanger (also known as a vaporizer) for changing the first portion of hydrogen fuel flowing therethrough from the liquid phase to a gaseous phase. The inventors of the present disclosure have found, however, that in order to provide an efficient pump, the pump may be sized for cruise operations. In such a manner, the pump may be configured to provide a maximum fuel flowrate that is less than a commanded fuel flowrate for the engine during a high-power operation. With such a configuration, the fuel system may provide an additional fuel flow for such operations through, e.g., the gaseous hydrogen delivery assembly from the gaseous hydrogen fuel tank.

An additional, or alternative exemplary aspects of the present disclosure, the regulator assembly of the fuel delivery assembly may further include a buffer tank. The buffer tank may generally define a fluid inlet and a fluid outlet, and may be configured to vary a flow rate of gaseous hydrogen fuel from the fluid inlet to the fluid outlet. In such a manner, the buffer tank may facilitate relatively quick changes in necessary fuel flowrates to the engine, which may otherwise be difficult with a fuel system utilizing only a liquid hydrogen delivery assembly.

Other exemplary aspects of the present disclosure may further include methods of controlling a fuel delivery assembly utilizing the benefits of one or more of these exemplary structures. For example, in one every aspect, inclusion of the gaseous hydrogen fuel tank in addition to the liquid hydrogen fuel tank may facilitate starting the engine utilizing a flow of gaseous hydrogen fuel from the gaseous hydrogen fuel tank, prior to the engine generating a sufficient amount of heat to change the phase of liquid hydrogen fuel from the liquid hydrogen fuel tank to gaseous hydrogen fuel. Such may enable usage of an engine heat exchanger with the liquid hydrogen delivery assembly during remaining operations of the engine.

Other example embodiments are described herein below and may be disclosed with reference to the figures.

Referring now to FIG. 1, a perspective view of a vehicle of the present disclosure is provided. Specifically, for the exemplary embodiment of FIG. 1, the vehicle is configured as an aeronautical vehicle, or aircraft 10. The exemplary aircraft 10 has a fuselage 12, wings 14 attached to the fuselage 12, and an empennage 16.

The exemplary aircraft 10 further includes a fuel system 20 having a liquid hydrogen fuel tank 22 for holding a first portion of hydrogen fuel in a liquid phase. In the exemplary aircraft 10 shown in FIG. 1, at least a portion of the liquid hydrogen fuel tank 22 is located in a wing 14 of the aircraft 10. In some embodiments, however, the liquid hydrogen fuel tank 22 may be located at other suitable locations in the fuselage 12 or the wing 14. It will be appreciated that the first portion of hydrogen fuel is stored in the liquid hydrogen fuel tank 22 at a relatively low temperature. For example, the first portion of hydrogen fuel may be stored in the liquid hydrogen fuel tank 22 at about −253 Deg. Celsius or less at an atmospheric pressure, or at other temperatures and pressures to maintain the hydrogen fuel substantially in the liquid phase. The liquid hydrogen fuel tank 22 may be made from known materials such as titanium, Inconel, aluminum, or composite materials.

For the exemplary embodiment of FIG. 1, the exemplary fuel system 20 further includes a gaseous hydrogen fuel tank 23 for holding a second portion of hydrogen fuel in a gaseous phase. Although for the embodiment shown in FIG. 1, the gaseous hydrogen fuel tank 23 is positioned within the fuselage 12 of the aircraft 10, in other embodiments, the gaseous hydrogen fuel tank 23 may be positioned at any other suitable location. In at least certain exemplary aspects, the gaseous hydrogen fuel tank 23 may include a plurality of gaseous hydrogen fuel tank 23 (in which case the term "gaseous hydrogen fuel tank" refers to all of the gaseous hydrogen fuel tanks). Further, the gaseous hydrogen fuel tank 23 may be configured to store the second portion of hydrogen fuel at an increased pressure so as to reduce a necessary size of the gaseous hydrogen fuel tank 23 within the aircraft 10.

The aircraft 10 further includes a propulsion system 24 that produces a propulsive thrust required to propel the aircraft 10 in flight, during taxiing operations, etc. Although the propulsion system 24 is shown attached to the wing(s) 14 in FIG. 1, in other embodiments it may additionally or alternatively include one or more aspects coupled to other parts of the aircraft 10, such as, for example, the empennage 16, the fuselage 12, or both.

For the exemplary aspect depicted, the propulsion system 24 includes an engine, and more specifically includes a pair of engines. More specifically, still, each of the engines in the pair of engines is configured as a gas turbine engine 26 mounted to one of the respective wings 14 of the aircraft 10 in an under-wing configuration through a respective pylon 28. Each gas turbine engine 26 is capable of selectively generating a propulsive thrust for the aircraft 10. The amount of propulsive thrust may be controlled at least in part based on a volume (or more specifically a mass flowrate) of fuel provided to the gas turbine engines 26 via the fuel system 20.

Figure 2:
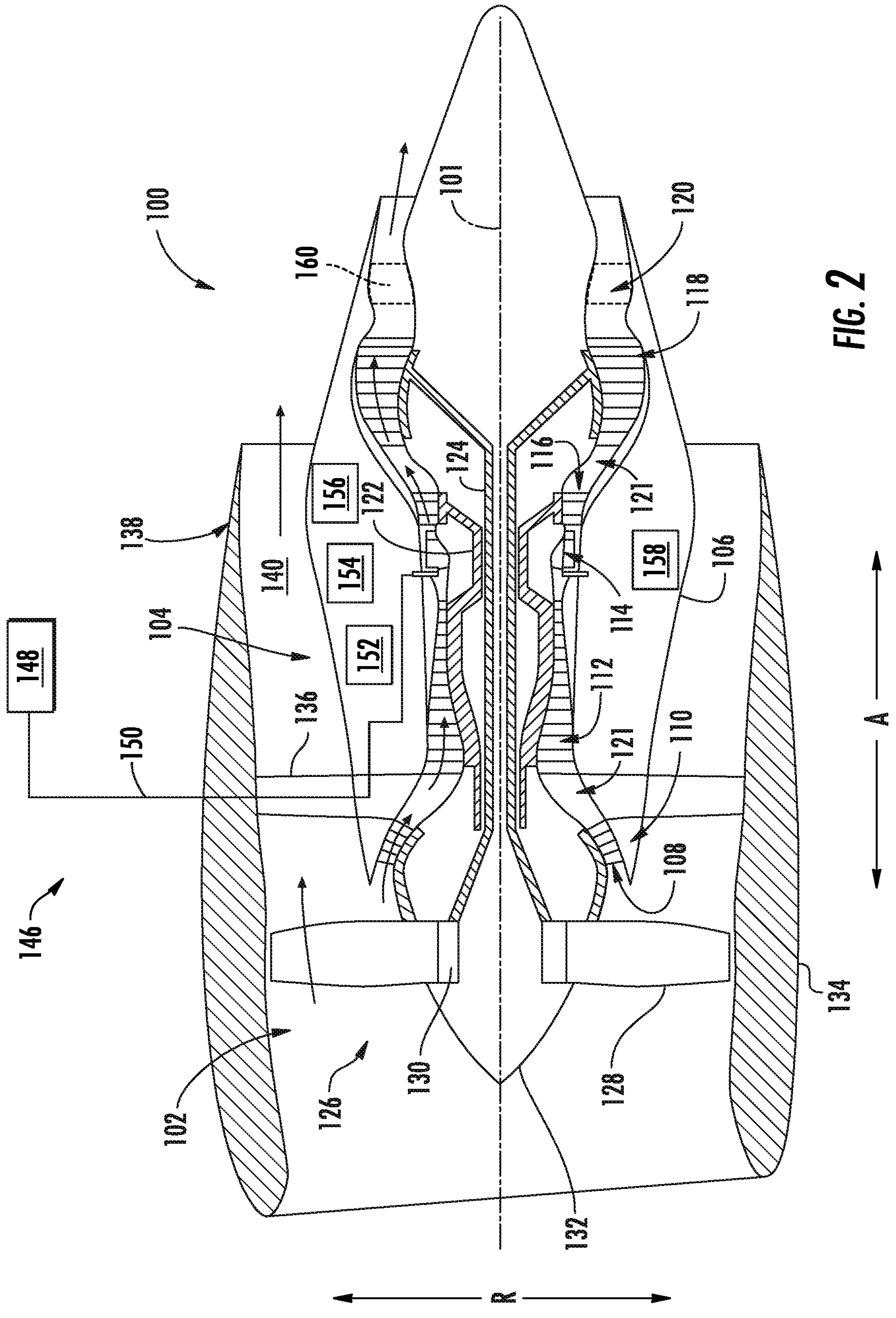
FIG. 2 is a schematic, cross-sectional view of a gas turbine engine in accordance with an exemplary embodiment of the present disclosure.

Referring now to FIG. 2, a schematic, cross-sectional view of a gas turbine engine in accordance with an exemplary embodiment of the present disclosure is provided. For example, the exemplary gas turbine engine of FIG. 2 may be incorporated into propulsion system 24 described above with reference to FIG. 1 as one of the gas turbine engines 26.

For the embodiment depicted, the engine is configured as a high bypass turbofan engine 100. As shown in FIG. 1, the turbofan engine 100 defines an axial direction A (extending parallel to a longitudinal centerline 101 provided for reference), a radial direction R, and a circumferential direction (extending about the axial direction A; not depicted in FIG. 2). In general, the turbofan 100 includes a fan section 102 and a turbomachine 104 disposed downstream from the fan section 102.

The exemplary turbomachine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, and turbine section together define at least in part a core air flowpath 121 extending from the annular inlet 108 to the jet nozzle exhaust section 120. The turbofan engine 10 further includes one or more drive shafts. More specifically, the turbofan engine includes a high pressure (HP) shaft or spool 122 drivingly connecting the HP turbine 116 to the HP compressor 112, and a low pressure (LP) shaft or spool 124 drivingly connecting the LP turbine 118 to the LP compressor 110.

For the embodiment depicted, the fan section 102 includes a fan 126 having a plurality of fan blades 128 coupled to a disk 130 in a spaced apart manner. The fan blades 128 and disk 130 are together rotatable about the longitudinal axis 201 by the LP shaft 124. The disk 130 is covered by rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially-spaced outlet guide vanes 136. A downstream section 138 of the nacelle 134 extends over an outer portion of the turbomachine 104 so as to define a bypass airflow passage 140 therebetween.

Referring still to FIG. 2, the turbofan engine 100 is operable with a fuel system 146 for receiving a flow of fuel from the fuel system 146. The fuel system 146 may be configured similarly to the fuel system 20 of FIG. 1. Accordingly, the fuel system 146 generally includes a fuel tank 148, and a fuel delivery assembly 150. The fuel delivery assembly 150 provide a fuel flow from the fuel tank 148 to the engine 100, and more specifically to a fuel manifold (not labeled) of the combustion section 114 of the turbomachine 104 of the turbofan engine 100.

Moreover, as is depicted schematically, the exemplary turbofan engine 100 further includes various accessory systems to aid in the operation of the turbofan engine 100 and/or an aircraft including the turbofan engine 100. For example, the exemplary turbofan engine 100 further includes a main lubrication system 152 configured to provide a lubricant to, e.g., various bearings and gear meshes in the compressor section, the turbine section, the HP spool 122, the LP spool 124, etc. The lubricant provided by the main lubrication system 152 may increase the useful life of such components and may remove a certain amount of heat from such components. Additionally, the turbofan engine 100 includes a compressor cooling air (CCA) system 154 for providing air from one or both of the HP compressor 112 or LP compressor 110 to one or both of the HP turbine 116 or LP turbine 118. Moreover, the exemplary turbofan engine 100 includes an active thermal clearance control (ACC) system 156 for cooling a casing of the turbine section to maintain a clearance between the various turbine rotor blades and the turbine casing within a desired range throughout various engine operating conditions. Furthermore, the exemplary turbofan engine 100 includes a generator lubrication system 158 for providing lubrication to an electronic generator (not shown), as well as cooling/heat removal for the electronic generator. The electronic generator may provide electrical power to, e.g., a startup electric motor for the turbofan engine 100 and/or various other electronic components of the turbofan engine 100 and/or an aircraft including the turbofan engine 100.

Heat from these accessory systems 152, 154, 156, 158, and other accessory systems may be provided to various heat sinks as waste heat from the turbofan engine 100 during operation (e.g., to various heat exchangers or vaporizers, as discussed below). Additionally, for the embodiment depicted, the turbofan engine 100 further includes one or more heat exchangers 160 within, e.g., the turbine section or exhaust section 120 for extracting waste heat from an airflow therethrough, such that the waste heat may be utilized to add heat to various heat sinks as waste heat during operation (e.g., to various vaporizers, as discussed below).

It will be appreciated, however, that the exemplary turbofan engine 100 depicted in FIG. 1 is provided by way of example only. In other exemplary embodiments, any other suitable engine may be utilized with aspects of the present disclosure. For example, in other embodiments, the engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc. Further, although the exemplary gas turbine engine depicted in FIG. 1 is shown schematically as a direct drive, fixed-pitch turbofan engine 100, in other embodiments, a gas turbine engine of the present disclosure may be a geared gas turbine engine (i.e., including a gearbox between the fan 126 and shaft driving the fan, such as the LP shaft 124), may be a variable pitch gas turbine engine (i.e., including a fan 126 having a plurality of fan blades 128 rotatable about their respective pitch axes), etc. Further, still, in alternative embodiments, aspects of the present disclosure may be incorporated into, or otherwise utilized with, any other type of engine, such as reciprocating engines. Additionally, in still other exemplary embodiments, the exemplary turbofan engine 100 may include or be operably connected to any other suitable accessory systems. Additionally, or alternatively, the exemplary turbofan engine 100 may not include or be operably connected to one or more of the accessory systems 152, 154, 156, 158 discussed above.

Figure 3:
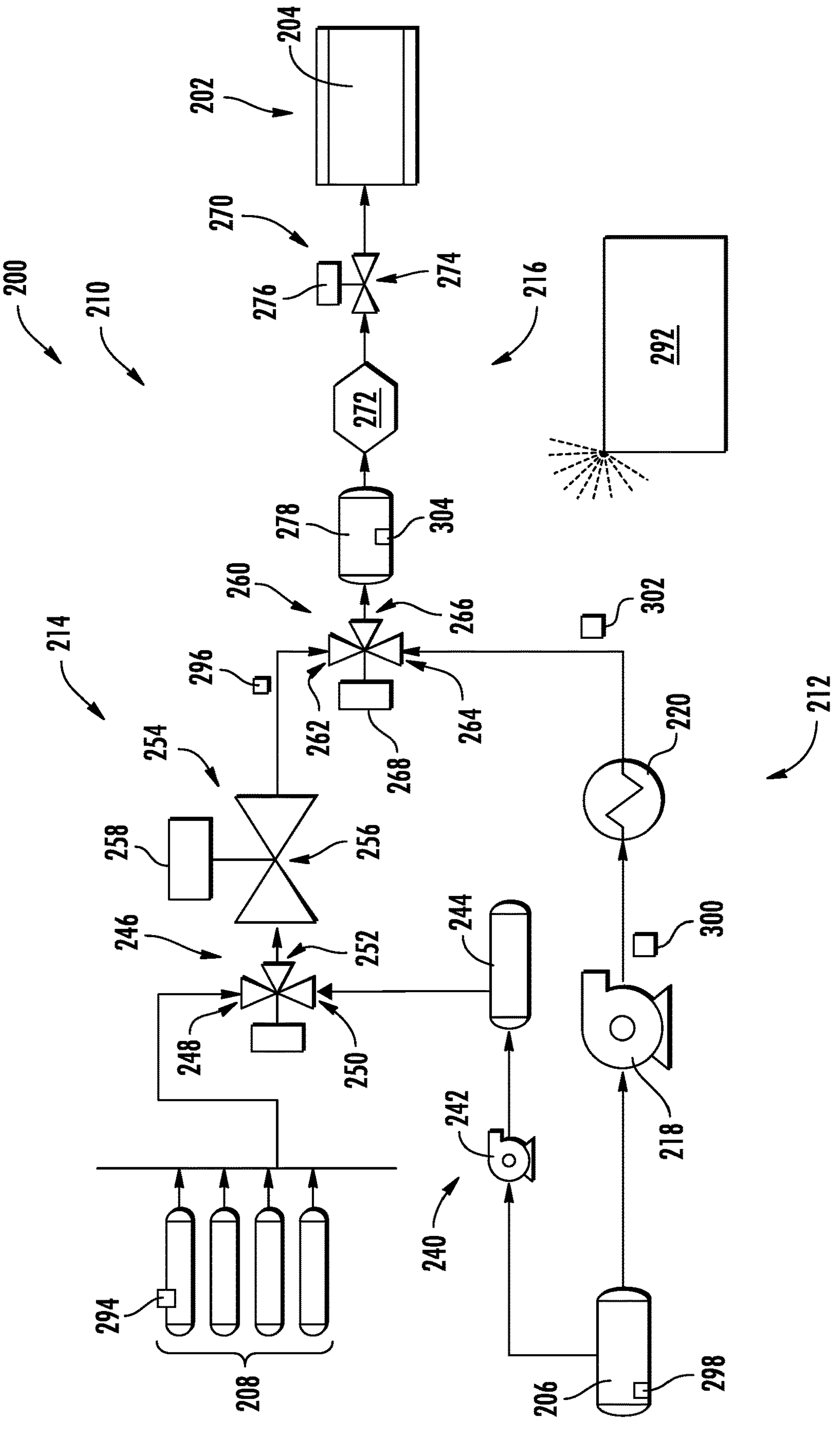
FIG. 3 is a schematic view of a fuel system in accordance with an exemplary aspect of the present disclosure.

Referring now to FIG. 3, a schematic view of a fuel system 200 for a vehicle having an engine 202 (e.g., the vehicle 10 and engine 100) in accordance with an exemplary embodiment of the present disclosure is provided. More specifically, for the exemplary embodiment of FIG. 3, the vehicle may be an aeronautical vehicle, such as the exemplary aircraft 10 of FIG. 1, and the engine 202 may be an aeronautical gas turbine engine, such as the exemplary engines 26 of FIG. 1 and/or the exemplary turbofan engine 100 of FIG. 2. As will be appreciated, the engine 202 generally includes a combustion section having a combustor 204 with, e.g., one or more fuel nozzles (not depicted).

It will be appreciated, however, that in other embodiments, the vehicle may be any other suitable land or aeronautical vehicle and the engine 202 may be any other suitable engine mounted to or within the vehicle in any suitable manner.

The exemplary fuel system 200 depicted is generally a hydrogen fuel system configured to store a hydrogen fuel and provide the hydrogen fuel to the engine 202.

For the embodiment shown, the fuel system 200 generally includes a liquid hydrogen fuel tank 206 for holding a first portion of hydrogen fuel in a liquid phase. The liquid hydrogen fuel tank 206 may more specifically be configured to store the first portion of hydrogen fuel substantially completely in the liquid phase. For example, the liquid hydrogen fuel tank 206 may be configured to store the first portion at a temperature of about −253° C. or less, and at a pressure greater than about one bar and less than about 10 bar, such as between about three bar and about five bar, or at other temperatures and pressures to maintain the hydrogen fuel substantially in the liquid phase.

It will be appreciated that as used herein, the term "substantially completely" as used to describe a phase of the hydrogen fuel refers to at least 99% by mass of the described portion of the hydrogen fuel being in the stated phase, such as at least 97.5%, such as at least 95%, such as at least 92.5%, such as at least 90%, such as at least 85%, such as at least 75% by mass of the described portion of the hydrogen fuel being in the stated phase.

The fuel system 200 further includes a gaseous hydrogen fuel tank 208 configured to store a second portion of hydrogen fuel in a gaseous phase. The gaseous hydrogen fuel tank 208 may be configured to store the second portion of hydrogen fuel at an increased pressure so as to reduce a necessary size of the gaseous hydrogen fuel tank 208 within the aircraft 10. For example, in certain exemplary aspects, the gaseous hydrogen fuel tank 208 may be configured to store the second portion of hydrogen fuel at a pressure of at least about 100 bar, such as at least about 200 bar, such as at least about 400 bar, such as at least about 600 bar, such as at least about 700 bar, and up to about 1,000 bar. The gaseous hydrogen fuel tank 208 may be configured to store the second portion of the hydrogen fuel at a temperature within about 50° C. of an ambient temperature, or between about −50° C. and about 100° C.

It will be appreciated, that for the embodiment depicted, the gaseous hydrogen fuel tank 208 is more specifically a plurality of gaseous hydrogen fuel tank 208. The gaseous hydrogen fuel tank 208 may be configured as a plurality of gaseous hydrogen fuel tank 208 to reduce an overall size and weight that would otherwise be needed to contain the desired volume of the second portion of hydrogen fuel in the gaseous phase at the desired pressures.

As will further be appreciated, a substantial portion of the total hydrogen fuel storage capacity of the fuel system 200 is provided by the liquid hydrogen fuel tank 206. For example, in certain exemplary embodiments, the fuel system 200 defines a maximum fuel storage capacity. The liquid hydrogen fuel tank 206 may provide more than 50% of the maximum fuel storage capacity (in kilograms), with the remaining portion provided by the gaseous hydrogen fuel tank 208. For example, in certain exemplary aspects, the liquid hydrogen fuel tank 206 may provide at least about 60% of the maximum fuel storage capacity, such as at least about 70% of the maximum fuel storage capacity, such as at least about 80% of the maximum fuel storage capacity, such as up to about 98% of the maximum fuel storage capacity, such as up to about 95% of the maximum fuel storage capacity. The gaseous hydrogen fuel tank 208 may be configured to provide the remaining fuel storage capacity, such as at least about 2% of the maximum fuel storage capacity, such as at least about 5% of the maximum fuel storage capacity, such as at least about 10% of the maximum fuel storage capacity, such as at least about 15% of the maximum fuel storage capacity, such as at least about 20% of the maximum fuel storage capacity, such as up to 50% of the maximum fuel storage capacity, such as up to about 40% of the maximum fuel storage capacity.

Referring still to FIG. 3, the fuel system 200 further includes a fuel delivery assembly 210. The fuel delivery assembly 210 generally includes a liquid hydrogen delivery assembly 212 in fluid communication with the liquid hydrogen fuel tank 206, a gaseous hydrogen delivery assembly 214 in fluid communication with the gaseous hydrogen fuel tank 208, and a regulator assembly 216 in fluid communication with both the liquid hydrogen delivery assembly 212 and the gaseous hydrogen delivery assembly 214 for providing hydrogen fuel to the engine 202.

The liquid hydrogen delivery assembly 212 generally includes a pump 218 and a heat exchanger 220 located downstream of the pump 218. The pump 218 is configured to provide a flow of the first portion of hydrogen fuel in the liquid phase from the liquid hydrogen fuel tank 206 through the liquid hydrogen delivery assembly 212. Operation of the pump 218 may be or decreased to effectuate a change in a volume of the first portion of hydrogen fuel through the liquid hydrogen delivery assembly 212, and to the regulator assembly 216 and engine 202. The pump 218 may be any suitable pump configured to provide a flow of liquid hydrogen fuel. For example, in certain exemplary aspects, the pump 218 may be configured as a cryogenic pump.

More specifically, in the exemplary aspect depicted, the pump 218 is the primary pump for the liquid hydrogen delivery assembly 212, such that substantially all of a motive force available for providing a flow of liquid hydrogen through the liquid hydrogen delivery assembly 212 (excluding an internal pressurization of the liquid hydrogen fuel tank 206) is provided by the pump 218. For example, at least about 75% of the motive force available for providing a flow of liquid hydrogen through the liquid hydrogen delivery assembly 212 may be provided by the pump 218, such as at least about 80%, such as at least about 85%, such as at least about 90%, such as at least about 95%, such as about 100%.

It will be appreciated that in at least certain exemplary aspects, particularly given the difficulty of pumping a fluid at the relatively low temperatures required to maintain hydrogen in the liquid phase, the pump 218 may not be capable of operating across a wide operating range. For example, the pump 218 may generally define a maximum pump capacity and a minimum pump capacity (each in kilograms per second). A ratio of the maximum pump capacity to the minimum pump capacity may be referred to as a turndown ratio of the pump 218. In at least certain exemplary aspects, the pump 218 may define a turndown ratio of at least 1:1 and up to about 6:1. For example, in certain exemplary aspects, the pump 218 may define a turndown ratio of at least about 2:1, such as at least about 3:1, and up to about 5:1. The effect of such a configuration on the fuel system 200 will be described in greater detail below.

The heat exchanger 220, as noted, is located downstream of the pump 218 and is configured to convert the second portion of hydrogen fuel through the liquid hydrogen delivery assembly 212 from the liquid phase to a gaseous phase. With at least certain exemplary aspects, the heat exchanger 220 may be in thermal communication with the engine 202, and more specifically, with an accessory system of the engine 202 to provide the heat necessary to increase a temperature of the second portion of the hydrogen fuel through the liquid hydrogen delivery assembly 212 to change the second portion of the hydrogen fuel from the liquid phase to the gaseous phase.

Figure 4:
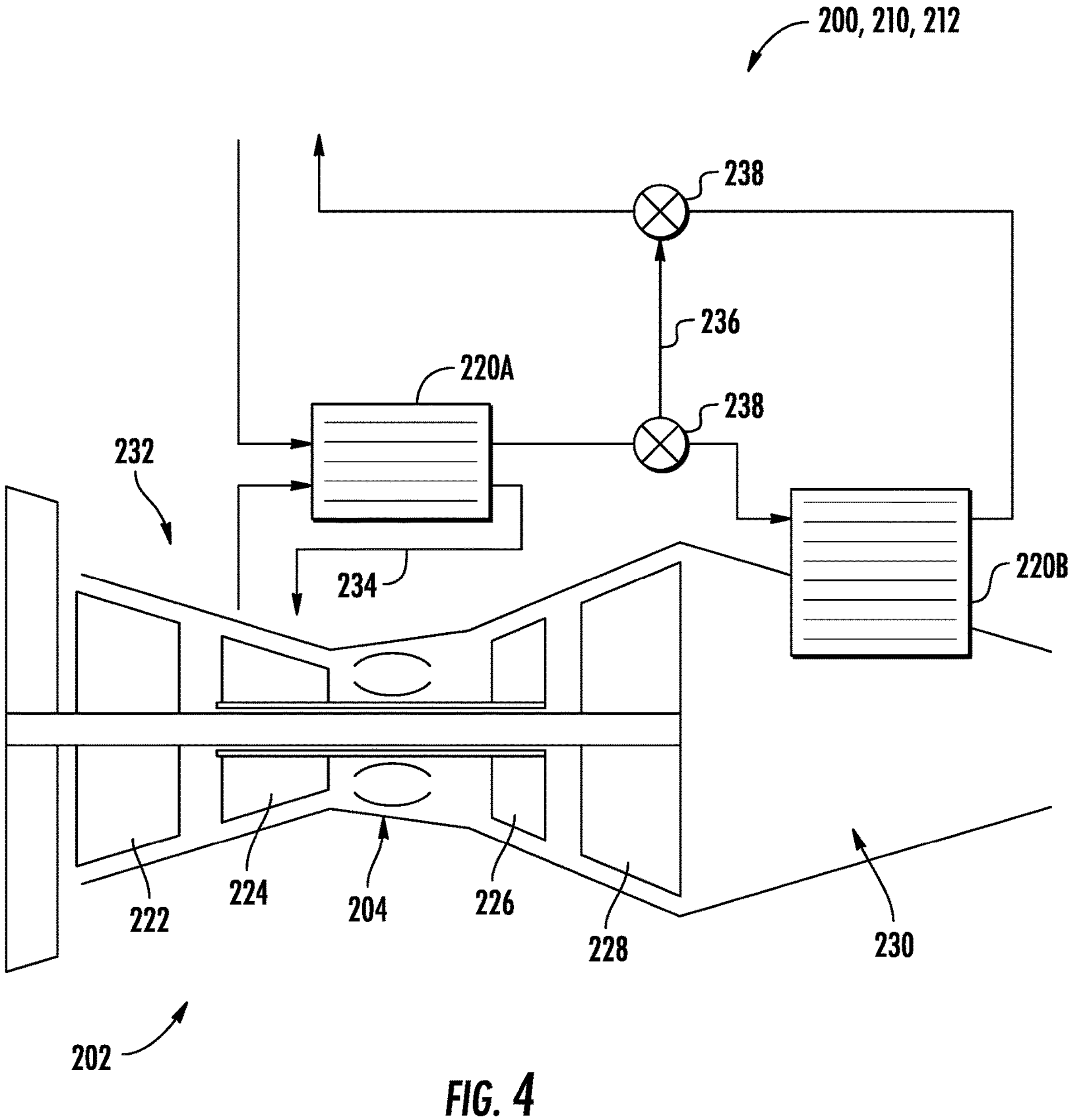
FIG. 4 is a schematic view of a heat exchanger assembly in accordance with an exemplary aspect of the present disclosure.

For example, referring now to FIG. 4, a schematic view of an engine 202 in accordance with an exemplary aspect of the present disclosure is provided. The exemplary engine 202 of FIG. 5 may be configured in a similar manner as exemplary turbofan engine 100 of FIG. 2. For example, the exemplary engine 202 generally includes a compressor section having an LP compressor 222 and an HP compressor 224, a combustion section including the combustor 204, a turbine section including an HP turbine 226 and an LP turbine 228, and an exhaust section 230. As with the exemplary turbofan engine 100 of FIG. 2, the exemplary engine 202 of FIG. 4 may include one or more accessory systems.

More specifically, for the exemplary engine 202 of FIG. 4, the engine 202 includes a first accessory system 232, which may be, e.g., a lubrication oil system. The lubrication oil system generally includes a recirculation assembly 234 for receiving relatively hot lubrication oil from within the engine 202, cooling the relatively hot lubrication oil, and providing the relatively cool lubrication oil back to the engine 202.

For the embodiment depicted, the heat exchanger 220 of the liquid hydrogen delivery assembly 212 more particularly includes a first fuel system heat exchanger 220A, with the first fuel system heat exchanger 220A configured in thermal communication with the first accessory system 232/recirculation assembly 234 of the lubrication oil system. In such a manner, heat from the flow of lubrication oil through the recirculation assembly 234 of the lubrication oil system may be transferred to a flow of the first portion of hydrogen fuel through the liquid hydrogen delivery assembly 212.

It will be appreciated, however, that during certain operations, the additional heat may be needed. For example, during high fuel flowrate operations, additional heat may be needed to properly vaporize the first portion of hydrogen fuel through the liquid hydrogen delivery assembly 212. Additionally, or alternatively, during initial engine operations, when the lubrication oil may not contain a high amount of heat, additional heat may be needed to properly vaporize the first portion of hydrogen fuel through the liquid hydrogen delivery assembly 212.

Accordingly, for the embodiment depicted, the heat exchanger 220 of the liquid hydrogen delivery assembly 212 additionally includes a second accessory system heat exchanger 220B. The second accessory system heat exchanger 220B is positioned in thermal communication with the exhaust section 230 of the engine 202 for receiving waste heat from an exhaust gas flowing through the exhaust section 230 of the engine 202 during operation of the engine 202.

In such a manner, it will be appreciated that the heat exchanger 220 of the liquid hydrogen delivery assembly 212, and more specifically, the first accessory system heat exchanger 220A and the second accessory system heat exchanger 220B, are in thermal communication with both the lubrication oil system and the exhaust section 230 of the engine 202 during at least certain operations.

However, as will be appreciated, for the exemplary embodiment depicted in FIG. 4, the liquid hydrogen delivery assembly 212 further includes a bypass line 236 and one or more bypass valves 238. In such a manner, the liquid hydrogen delivery assembly 212 may be capable of bypassing, e.g., the second accessory system heat exchanger 220B when heat from the second accessory system heat exchanger 220B is not needed to properly vaporize the first portion of hydrogen fuel through the liquid hydrogen delivery assembly 212.

It will be appreciated, however that although for the embodiment depicted, the heat exchanger 220 of the liquid hydrogen delivery assembly 212 is positioned proximate the engine 202 (and potentially integrated at least partially into the exemplary engine 202), in other embodiments, the heat exchanger 220 of the liquid hydrogen delivery assembly 212 may be located remotely from the exemplary engine 202, and an intermediate thermal transport bus may transport heat from the engine 202 to the heat exchanger 220 of the liquid hydrogen delivery assembly 212 using, e.g., an intermediate heat transfer fluid.

Referring back particularly to FIG. 3, it will be appreciated that the liquid hydrogen fuel tank 206 may define a fixed volume, such that as the liquid hydrogen fuel tank 206 provides hydrogen fuel to the fuel system 200 substantially completely in the liquid phase, a volume of the liquid hydrogen fuel in the liquid hydrogen fuel tank 206 decreases, and the volume is made up by, e.g., gaseous hydrogen fuel. Further, during the normal course of storing the first portion of hydrogen fuel in the liquid phase, an amount of the first portion of hydrogen fuel may vaporize.

In order to prevent an internal pressure within the liquid hydrogen fuel tank 206 from exceeding a desired pressure threshold, the exemplary fuel system 200 of FIG. 3 allows for a purging of gaseous hydrogen fuel from the liquid hydrogen fuel tank 206. More specifically, for the exemplary embodiment of FIG. 3, the exemplary fuel delivery assembly 210 of the fuel system 200 includes a boil-off fuel assembly 240 configured to receive gaseous hydrogen fuel from the liquid hydrogen fuel tank 206. The exemplary boil-off fuel assembly 240 generally includes a boil-off compressor 242 and a boil-off tank 244. The boil-off tank 244 is in fluid communication with the liquid hydrogen fuel tank 206 and is further in fluid communication with the gaseous hydrogen delivery assembly 214. During operation, gaseous fuel from the liquid hydrogen fuel tank 206 may be received in the boil-off fuel assembly 240, may be compressed by the boil-off compressor 242 and provided to the boil-off tank 244. The boil-off tank 244 may be configured to store the gaseous hydrogen fuel at a lower pressure than the pressure of the second portion of the hydrogen fuel within the gaseous hydrogen fuel tank 208. For example, the boil-off tank 244 may be configured to maintain gaseous hydrogen fuel therein at a pressure of between about 100 bar and about 400 bar, such as between 130 bar and about 300 bar. The pressurization of the gaseous hydrogen fuel in the boil-off tank 244 may be provided substantially completely by the boil-off compressor 242. Maintaining the gaseous hydrogen fuel in the boil-off tank 244 at the lower pressure may allow for the boil-off compressor 242 to be relatively small.

Referring again to the gaseous hydrogen delivery assembly 214, the gaseous hydrogen delivery assembly 214 generally includes a three-way boil-off valve 246 defining a first input 248, a second input 250, and an output 252. The first input 248 may be in fluid communication with the gaseous hydrogen fuel tank 208 for receiving a flow of the second portion of hydrogen fuel in the gaseous phase from the gaseous hydrogen fuel tank 208. For the embodiment depicted, the second input 250 is in fluid communication with the boil-off fuel assembly 240 for receiving a flow of gaseous hydrogen fuel from, e.g., the boil-off tank 244 of the boil-off fuel assembly 240. The three-way boil-off valve 246 may be configured to combine and/or alternate the flows from the first input 248 and the second input 250 to a single flow of gaseous hydrogen through the output 252. For the embodiment shown, the three-way boil-off valve 246 is an active valve, such that an amount of gaseous hydrogen fuel provided from the first input 248, as compared to the amount of gaseous hydrogen fuel provided from the second input 250, to the output 252 may be actively controlled.

In other exemplary embodiments, the three-way boil-off valve 246 may be a passive valve.

For the embodiment shown, the regulator assembly 216 further includes a gaseous hydrogen delivery assembly flow regulator 254 ("GHDA flow regulator 254"). The GHDA flow regulator 254 may be configured as an actively controlled variable throughput valve configured to provide a variable throughput ranging from 0% (e.g., a completely closed off position) to 100% (e.g., a completely open position), as well as a number of intermediate throughput values therebetween. More specifically, for the embodiment shown, the GHDA flow regulator 254 includes a valve portion 256 and an actuator 258. The actuator 258 is mechanically coupled to the valve portion 256 to provide the variable throughput therethrough.

As briefly mentioned, the regulator assembly 216 is in fluid communication with both the liquid hydrogen delivery assembly 212 and the gaseous hydrogen delivery assembly 214 for providing gaseous hydrogen fuel to the engine 202, and more specifically, to the combustor 204 of the engine 202.

Particularly for the embodiment depicted, the regulator assembly 216 includes a three-way regulator valve 260. The three-way regulator valve 260 defines a first input 262, a second input 264, and an output 266. The first input 262 may be in fluid communication with the gaseous hydrogen delivery assembly 214 for receiving a flow of the second portion of hydrogen fuel in the gaseous phase from the gaseous hydrogen fuel tank 208 (and, e.g., the boil-off fuel assembly 240). The second input 264 is in fluid communication with the liquid hydrogen delivery assembly 212 for receiving a flow of the first portion of the hydrogen fuel in the gaseous phase from the liquid hydrogen fuel tank 206 (vaporized using, e.g., the heat exchanger 220). The three-way boil-off valve 246 may be configured to combine and/or alternate the flows from the first input 262 and the second input 264 to a single flow of gaseous hydrogen through the output 266. For the embodiment shown, the three-way boil-off valve 246 is an active three-way boil-off valve 246, including an actuator 268, such that an amount of gaseous hydrogen fuel provided from the first input 262, as compared to the amount of gaseous hydrogen fuel provided from the second input 264, to the output 266 may be actively controlled.

In other exemplary embodiments, the three-way boil-off valve 246 may be a passive valve.

For the embodiment shown, the regulator assembly 216 further includes a regulator assembly flow regulator 270 ("RA flow regulator 270") and a flowmeter 272. The RA flow regulator 270 may be configured as an actively controlled variable throughput valve configured to provide a variable throughput ranging from 0% (e.g., a completely closed off position) to 100% (e.g., a completely open position), as well as a number of intermediate throughput values therebetween. More specifically, for the embodiment shown, the RA flow regulator 270 includes a valve portion 274 and an actuator 276. The actuator 276 is mechanically coupled to the valve portion 274 to provide the variable throughput therethrough.

The flowmeter 272 of the regulator assembly 216 may sense data indicative of a mass flow rate of hydrogen fuel through the regulator assembly 216. For example, the flowmeter 272 may sense data indicative of one or more of a temperature of the gaseous hydrogen fuel flowing therethrough and a pressure of the gaseous hydrogen fuel flowing therethrough. As will be explained in more detail below, data from the flowmeter 272 may be utilized to control the RA flow regulator 270 (and other components of the fuel system 200) to ensure a desired amount of fuel is provided to the combustor 204 of the engine 202.

Moreover, referring still to FIG. 3, it will be appreciated that the primary source of hydrogen fuel for the fuel system 200 may be provided from the liquid hydrogen fuel tank 206 through the liquid hydrogen delivery assembly 212. The inventors of the present disclosure have discovered, however, that it may be difficult to accurately and rapidly control (e.g., vary) an amount of gaseous hydrogen fuel available to be provided to the combustor 204 of the engine 202 by the RA flow regulator 270 of the regulator assembly 216 by simply by controlling, e.g., a speed of the pump 218 of the liquid hydrogen delivery assembly 212. Accordingly, the exemplary regulator assembly 216 depicted further includes a buffer tank 278.

Figure 5:
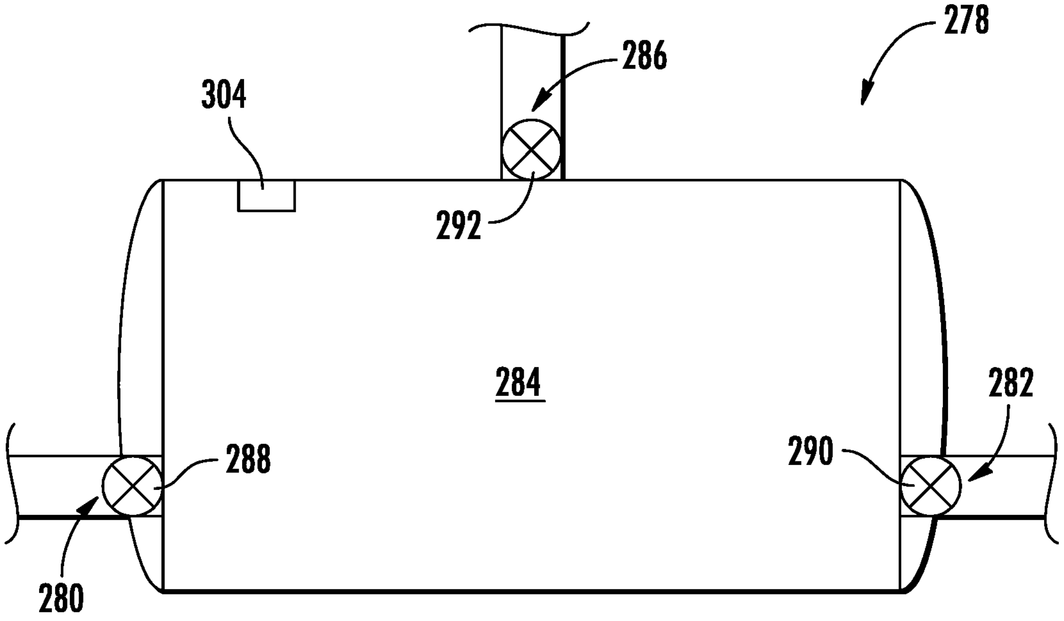
FIG. 5 is a schematic view of a buffer tank in accordance with an exemplary aspect of the present disclosure.

Referring now also to FIG. 5, a close-up, schematic view is provided of the buffer tank 278. As will be appreciated, the buffer tank 278 defines a fluid inlet 280, a fluid outlet 282, an internal cavity 284, and an exhaust 286. From high level, the buffer tank 278 is configured to vary a mass flow rate of the hydrogen fuel from the fluid inlet 280 to the fluid outlet 282 during at least certain operations.

More specifically, for the embodiment depicted, the buffer tank 278 further includes an inlet valve 288 at the fluid inlet 280 of the buffer tank 278, an outlet valve 290 at the fluid outlet 282 of the buffer tank 278, and an exhaust valve 292 at the exhaust 286 of the buffer tank 278. In certain exemplary embodiments, the inlet valve 288 may simply be a check valve to ensure hydrogen fuel may only flow into the internal cavity 284 of the buffer tank 278 through the fluid inlet 280. The outlet valve 290, however, may be a variable throughput valve configured to vary a flow rate of the hydrogen fuel flowing therethrough. The outlet valve 290 may be configured to be controlled based on a pressure difference between the internal cavity 284 and a downstream side of the fluid outlet 282. Additionally, or alternatively, the outlet valve 290 may be configured to be controlled based on a number of other parameters and/or conditions to facilitate a desired mass flow rate through the fluid outlet 282 of the buffer tank 278, as will be explained in more detail below.

As mentioned, the buffer tank 278 further includes the exhaust valve 292 at the exhaust 286 of the buffer tank 278. The buffer tank 278 may be configured to purge gaseous hydrogen fuel from within the buffer tank 278 through the exhaust valve 292 when an internal pressure of the buffer tank 278 (i.e., a pressure within the internal cavity 284) exceeds an upper threshold. Such may allow for the buffer tank 278 to accept hydrogen fuel through the fluid inlet 280 at a greater flow rate than provided by the buffer tank 278 through the fluid outlet 282 even when an internal pressure of the buffer tank 278 is at or exceeds an upper bound or upper threshold for the buffer tank 278 to, e.g., more rapidly reduce a mass flowrate of hydrogen fuel to the combustor 204 of the engine 202.

Referring back to FIG. 3, will be appreciated that for the embodiment depicted, the buffer tank 278, by virtue of its position within the regulator assembly 216, is in fluid communication with both the liquid hydrogen delivery assembly 212 and the gaseous hydrogen delivery assembly 214. As such, the buffer tank 278 may be configured to receive hydrogen fuel from both the liquid hydrogen delivery assembly 212 and the gaseous hydrogen delivery assembly 214.

Referring still to FIG. 3, it will be appreciated that the fuel system 200 further includes a controller 292. The controller 292 may be a controller 292 dedicated to the exemplary fuel system 200, or alternatively may be incorporated or configured as part of a controller 292 for the engine 202 (such as a full authority digital engine control, "FADEC," controller for the engine 202), a controller for the vehicle, etc.

The controller 292 is in operable communication with various aspects of the fuel system 200. For example, for the embodiment shown, the controller 292 is in operable communication with the various aspects of the liquid hydrogen delivery assembly 212 (including, e.g., the pump 218 and the heat exchanger 220), the gaseous hydrogen delivery assembly 214 (including, e.g., the actuator of the three-way boil-off valve 246 and the actuator of the GHDA flow regulator 254), the boil-off fuel assembly 240 (including, e.g., the boil-off compressor 242), the regulator assembly 216 (including, e.g., the actuator 268 of the three-way regulator valve 260, the exhaust valve 292 of the buffer tank 278, and the actuator 276 of the RA flow regulator 270).

As will further be appreciated from the exemplary embodiment of FIG. 3, the fuel system 200 further includes one or more sensors for sensing various operability parameters of the fuel system 200. For example, the exemplary fuel system 200 includes a first sensor 294 configured to sense data indicative of the gaseous hydrogen fuel tank 208 (e.g., an internal temperature, an internal pressure, a temperature and/or pressure of gaseous hydrogen fuel flowing from the gaseous hydrogen fuel tank 208, etc.), a second sensor 296 configured to sense data indicative of a flow of gaseous hydrogen fuel through the gaseous hydrogen delivery assembly 214 (e.g., a temperature, a pressure, and/or a flow rate of gaseous hydrogen fuel at a location upstream of the RA flow regulator 270, at a location downstream of the RA flow regulator 270, or both), a third sensor 298 configured to sense data indicative of the liquid hydrogen fuel tank 206 (e.g., an internal temperature, an internal pressure, a temperature and/or a pressure of liquid hydrogen fuel flowing from the liquid hydrogen fuel tank 206, etc.), a fourth sensor 300 configured to sense data indicative of a flow of liquid hydrogen fuel through the pump 218 (e.g., a temperature, a pressure, and/or a flow rate of liquid hydrogen fuel at a location upstream of the pump 218, at a location downstream of the pump 218, or both), a fifth sensor 302 configured to sense data indicative of a flow rate and/or phase of the hydrogen fuel downstream of the heat exchanger 220 (e.g., a temperature, a pressure, and/or a flow rate), a sixth sensor 304 configured sense data indicative of a hydrogen fuel within the buffer tank 278 (e.g., a pressure, a temperature, and/or a mass of hydrogen fuel within the internal cavity 284 of the buffer tank 278; see, also, FIG. 5), and the flowmeter 272. The controller 292 may further be in operable communication with any other suitable sensors configured sense data indicative of various operating conditions of the fuel delivery assembly 210 (e.g., temperatures, pressures, etc.), etc.

In such a manner, it will be appreciated that the controller 292 may be configured to control various operations of the fuel system 200 depending on, e.g., an operating condition of the fuel system 200, the engine 202, the vehicle, or a combination thereof. For example, as will be appreciated from the description herein, the controller 292 may be configured to implement one or more of the control schemes and methods described below with reference to FIG. 8 and FIG. 9.

Figure 6:
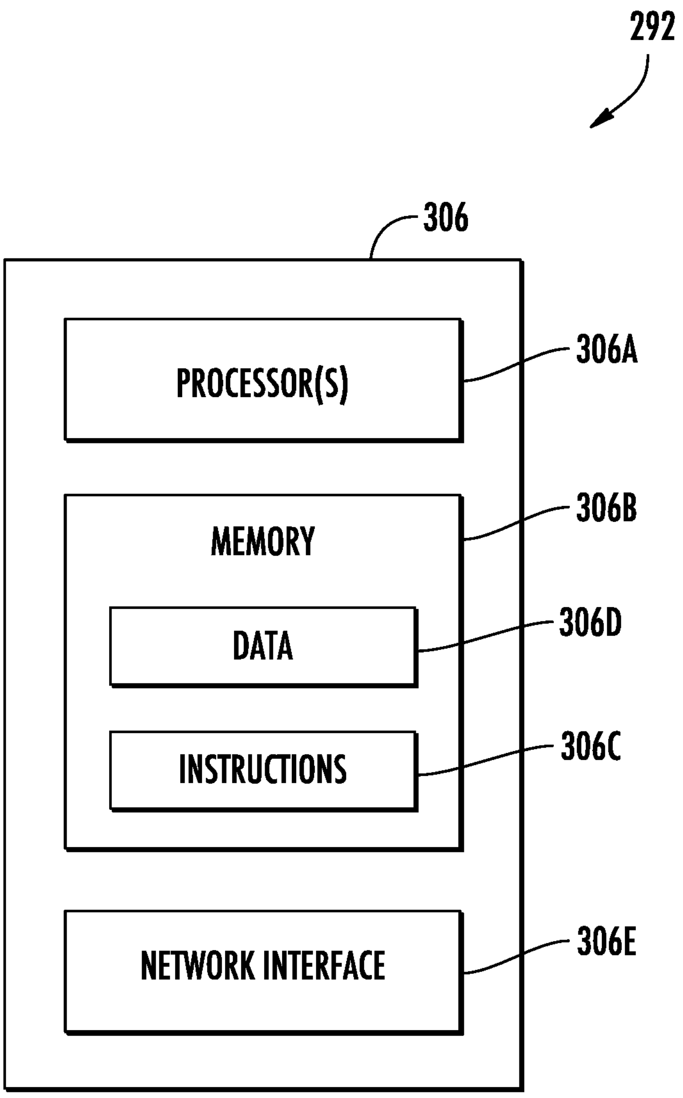
FIG. 6 is a schematic view of a controller as may be incorporated into a fuel system in accordance with an exemplary aspect of the present disclosure.

Referring now to FIG. 6, an exemplary embodiment of a controller 292 as may be incorporated into the exemplary fuel system 200 FIG. 3 is provided. The controller 292 can include one or more computing device(s) 306. The computing device(s) 306 can include one or more processor(s) 306A and one or more memory device(s) 306B. The one or more processor(s) 306A can include any suitable processing device, such as a microprocessor, microcontroller 292, integrated circuit, logic device, and/or other suitable processing device. The one or more memory device(s) 306B can include one or more computer-readable media, including, but not limited to, non-transitory computer-readable media, RAM, ROM, hard drives, flash drives, and/or other memory devices.

The one or more memory device(s) 306B can store information accessible by the one or more processor(s) 306A, including computer-readable instructions 306C that can be executed by the one or more processor(s) 306A. The instructions 306C can be any set of instructions that when executed by the one or more processor(s) 306A, cause the one or more processor(s) 306A to perform operations. In some embodiments, the instructions 306C can be executed by the one or more processor(s) 306A to cause the one or more processor(s) 306A to perform operations, such as any of the operations and functions for which the controller 292 and/or the computing device(s) 306 are configured, the operations for operating a fuel system 200 (e.g., flow chart 500, method 600), as described herein, and/or any other operations or functions of the one or more computing device(s) 306. The instructions 306C can be software written in any suitable programming language or can be implemented in hardware. Additionally, and/or alternatively, the instructions 306C can be executed in logically and/or virtually separate threads on processor(s) 306A. The memory device(s) 306B can further store data 306D that can be accessed by the processor(s) 306A.

The computing device(s) 306 can also include a network interface 306E used to communicate, for example, with the other components of system 500 (e.g., via a network). The network interface 306E can include any suitable components for interfacing with one or more network(s), including for example, transmitters, receivers, ports, controllers, antennas, and/or other suitable components. One or more external display devices (not depicted) can be configured to receive one or more commands from the computing device(s) 306. For example, as is depicted in phantom in FIG. 3, the controller 292 may be in operable communication with a variety of components of the fuel system 200 through a wireless communications network.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Figure 7:
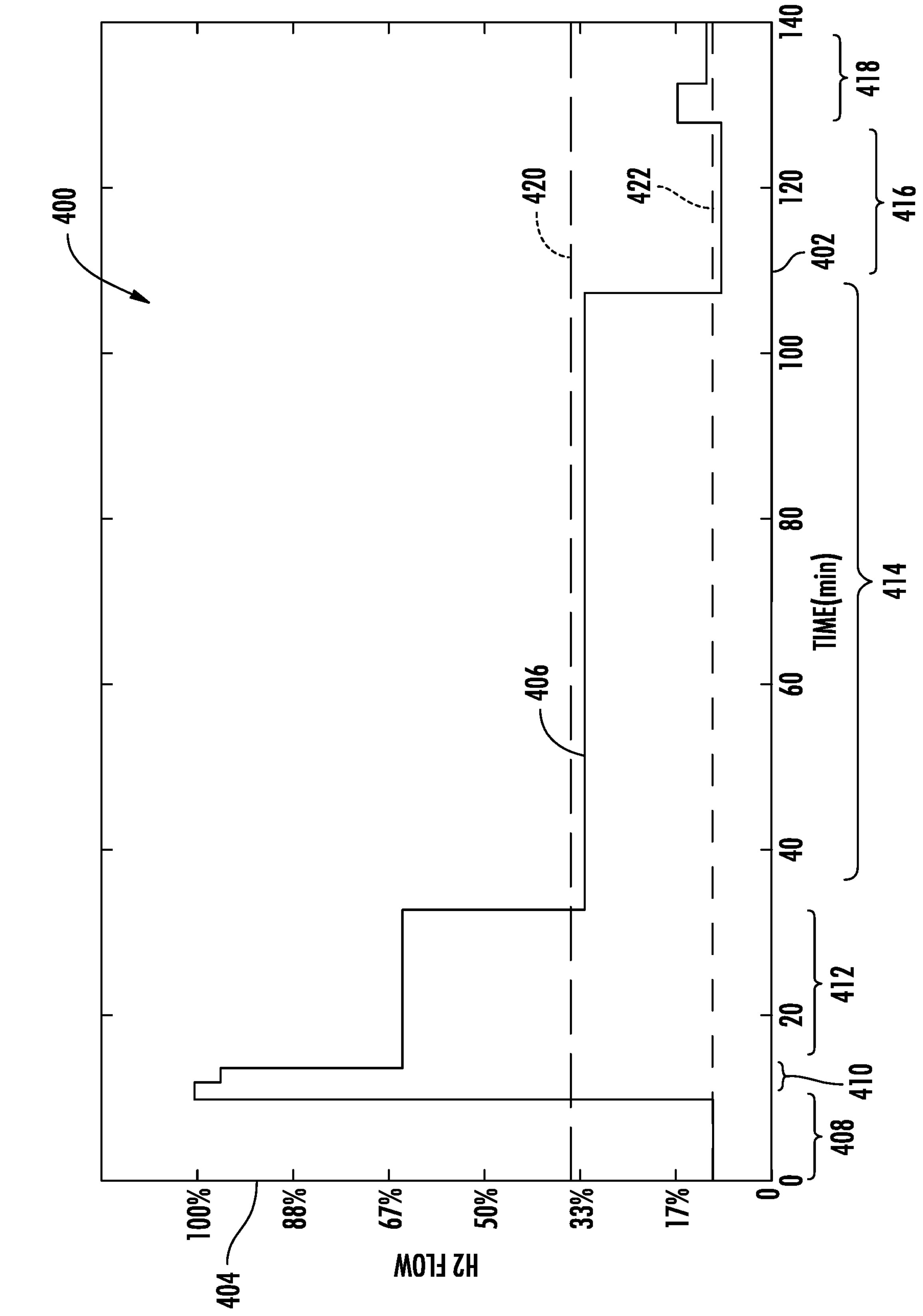
FIG. 7 is a graph depicting a commanded hydrogen fuel flow on a y-axis and time on an x-axis for a fuel system in accordance with an exemplary aspect of the present disclosure.

Referring back to FIG. 3, and now also to FIG. 7, various operations of the exemplary fuel system 200 will be described. FIG. 7 generally provides a graph 400 depicting a commanded hydrogen fuel flow on the y-axis 402 for a particular engine, and time on the x-axis 404. The commanded hydrogen fuel flow generally represents the commanded hydrogen fuel flow for a particular flight plan 406. More specifically, the flight plan 406 is a fuel usage rage of the engine during the flight plan.

In particular, referring to FIG. 7, a first phase 408 of the flight plan 406 is a taxi operation. As a be appreciated, a relatively low commanded hydrogen fuel flow is required during the taxi operation. A second phase 410 of the flight plan 406 is a takeoff operation. The takeoff operation, while relatively quick, requires a relatively high commanded hydrogen fuel flow (about 100% of a maximum commanded hydrogen fuel flow for the flight plan 406, the highest for the exemplary flight plan 406 depicted). Following the second phase 410 is a third phase 412 of the flight plan 406, which is a climb operation. The climb operation also requires a relatively high commanded hydrogen fuel flow (between about 50% and 90% of the maximum commanded hydrogen fuel flow). Following the third phase 412 is a fourth phase 414 of the flight plan 406. The fourth phase 414 is a cruise operation, which for the exemplary flight plan 406 depicted is the longest operation. During the cruise operation, the commanded hydrogen fuel flow is relatively low, (e.g., between about 20% and about 50% of the maximum commanded hydrogen fuel flow, such as between about 25% and about 40% of the maximum commanded hydrogen fuel flow). It will be appreciated, that a length of the cruise operation will vary with different flight plans. Further, the exemplary flight plan 406 depicted includes a fifth phase 416, which is an approach and landing operation. During most of the approach and landing operations, the commanded hydrogen fuel flow is the lowest of the flight plan 406 (e.g., less than about 20%, such as less than about 15% of the maximum commanded hydrogen fuel flow). Finally, the exemplary flight plan 406 depicted includes a sixth phase 418, which is a taxi operation following landing.

The exemplary fuel system 200 depicted in FIG. 3 is generally designed for most efficient operation during the largest phase of the flight plan 406—cruise operations. More specifically, as briefly noted above, the inventors of the present disclosure have found that inclusion of a pump 218 that may provide for flow of hydrogen fuel in the liquid phase may require inclusion of a pump with a relatively low turndown ratio (e.g., less than about 6:1, such as less than about 5:1). In such a manner, the inventors of the present disclosure found that it may be difficult to include a pump capable of providing the relatively high commanded hydrogen fuel flow required during certain flight operations, such as takeoff and climb operations, while still providing close to a desired commanded hydrogen fuel flow at lower power operations, such as cruise operations, taxi operations, and approach and landing operations.

Accordingly, the inventors of the present disclosure have come up with the exemplary fuel delivery assembly 210 depicted in FIG. 3 and described above, whereby the fuel delivery assembly 210 may be configured to provide a first range of hydrogen fuel flowrates to the engine 202 from the liquid hydrogen delivery assembly 212 that covers or substantially covers a bulk of the flight phases (e.g., all but takeoff and climb in the embodiment of FIG. 7), and may further be configured to provide a supplemental range of hydrogen fuel flow to the engine 202 from the gaseous hydrogen delivery assembly 214 to allow for the fuel system 200 to cover the remaining phases of the flight plan 406 (e.g., takeoff and climb in the embodiment of FIG. 7).

For example, FIG. 7 depicts a maximum pump capacity 420 of the pump 218 of the liquid hydrogen delivery assembly 212 and a minimum pump capacity 422 of the pump 218 of the liquid hydrogen delivery assembly 212. The fuel system 200 may be configured to provide substantially all of the necessary hydrogen fuel for the combustor 204 of the engine 202 between the maximum pump capacity 420 and minimum pump capacity 422 using the liquid hydrogen delivery assembly 212 (and, e.g., the buffer tank 278). The excess hydrogen fuel needed for the combustor 204 above the maximum pump capacity 420 may be provided by the gaseous hydrogen delivery assembly 214 (and, e.g., the buffer tank 278). When the engine operation of the flight plan 406 calls for less hydrogen fuel flow than the minimum pump capacity 422 of the pump 218, the fuel system 200 may be configured to absorb the excess hydrogen fuel flow with the buffer tank 278. Further, it will be appreciated that the buffer tank 278 may be configured to accommodate variations in fuel flow more quickly than would otherwise be capable of being provided through modulation of only the pump 218 of the liquid hydrogen delivery assembly 212.

For example, in certain exemplary aspects, the engine defines a first fuel usage rate during a high power operating condition, such as a takeoff operation condition (phase 410) or a climb operating condition (phase 412). The maximum pump capacity 420 of the pump is less than the first fuel usage rate. For example, the maximum pump capacity 420 of the pump may be less than 75% of the first fuel usage rate (i.e., the maximum pump capacity 420=the first fuel usage rate×0.75). In other exemplary aspects, the maximum pump capacity 420 of the pump may be less than about 50% of the first fuel usage rate, such as less than about 40% of the first fuel usage rate, such as at least about 15% of the first fuel usage rate, such as at least about 20% of the first fuel usage rate, such as at least about 25% of the first fuel usage rate.

Figure 8:
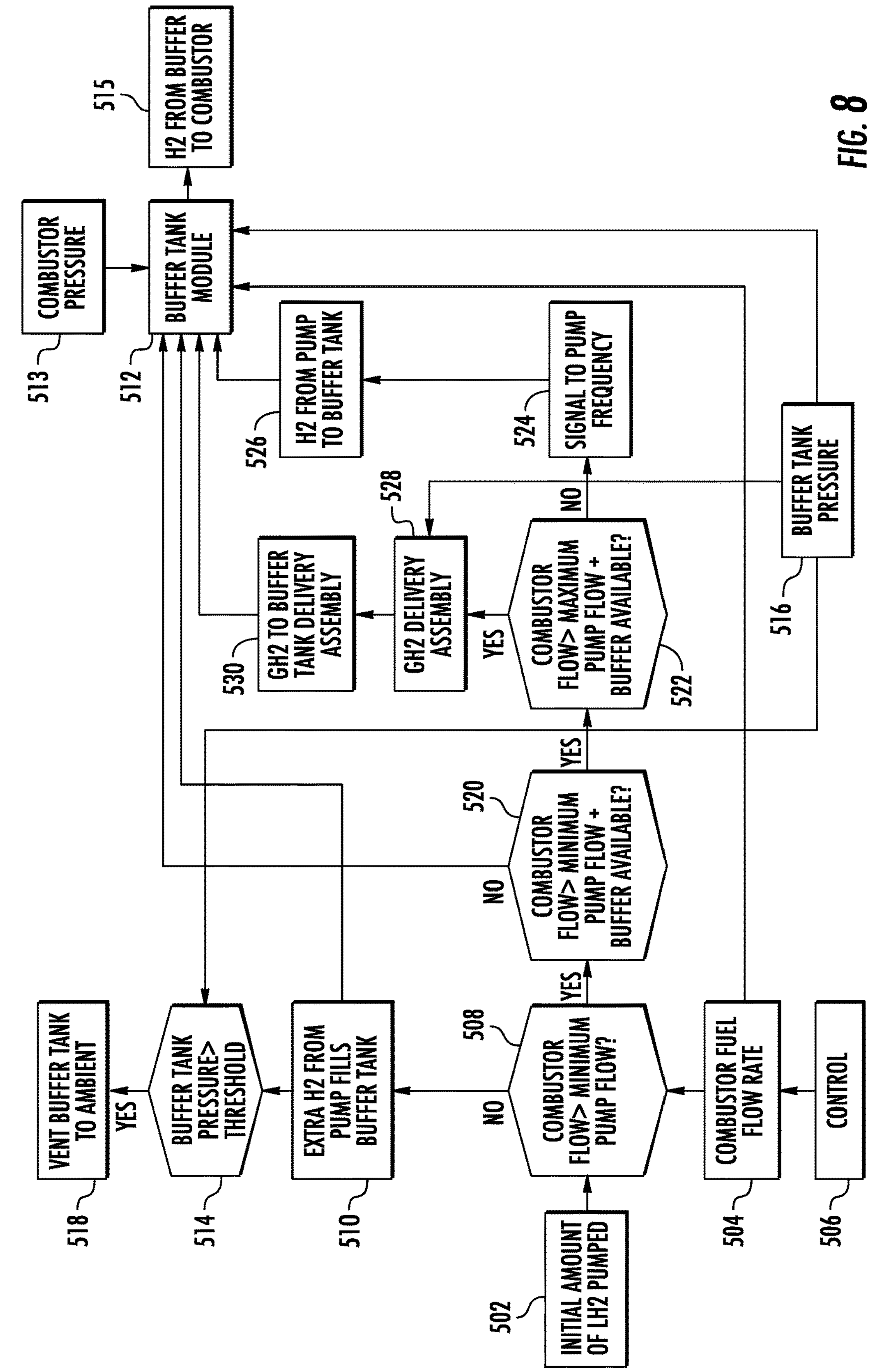
FIG. 8 is a flow chart depicting an operation of a fuel system in accordance with an exemplary aspect of the present disclosure.

Referring now to FIG. 8, a flow diagram 500 is provided showing operations in accordance with an exemplary aspect of the present disclosure. The logic outlined in the flow diagram 500 may be utilized with one or more of the exemplary fuel systems described above, such as the fuel system 200 of FIG. 3. In such a manner, it will be appreciated that the fuel system may generally include a liquid hydrogen fuel tank, a gaseous hydrogen fuel tank, and a fuel delivery assembly (which may be configured in a similar manner as the liquid hydrogen fuel tank 206, the gaseous hydrogen fuel tank 208, and the fuel delivery assembly 210 in FIG. 3). The fuel delivery assembly may generally include a liquid hydrogen delivery assembly, a gaseous hydrogen delivery assembly, and a regulator assembly having a buffer tank (which may be configured in a similar manner as the liquid hydrogen delivery assembly 212, the gaseous hydrogen delivery assembly 214, and the regulator assembly 216 having the buffer tank 278 in FIG. 3).

The flowchart 500 includes initially at (502) providing a minimum amount of liquid hydrogen fuel that may be provided through the liquid hydrogen delivery assembly. As with the embodiments above, a pump (which may be configured in a similar manner as pump 218 of FIG. 3) of the liquid hydrogen delivery assembly may define a turndown ratio preventing the fuel delivery assembly from providing less than the minimum amount of liquid hydrogen through the liquid hydrogen delivery assembly.

The flowchart 500 further includes at (504) determining a combustor fuel flowrate, which may include receiving a command from a controller at (506). The combustor fuel flowrate may be a commanded fuel flowrate for the combustor, which may correlate to a desired mass flow rate of gaseous hydrogen fuel to the combustor, and accordingly, a desired power output of the gas turbine engine.

The flowchart 500 receives the determined combustor fuel flowrate from (504) and the minimum amount of liquid hydrogen that may be provided through the liquid hydrogen delivery assembly at (502), and at (508) determines if the combustor fuel flowrate is greater than the minimum amount of liquid hydrogen that may be provided through the liquid hydrogen delivery assembly. If the answer is no, meaning the pump of the liquid hydrogen delivery assembly is not capable of providing the hydrogen fuel at the relatively low flow rate commanded, then the flowchart 500 includes at (510) providing the excess hydrogen fuel from the liquid hydrogen delivery assembly to the buffer tank, or more specifically providing a signal to a buffer tank control module (512), e.g., of a controller, to command the buffer tank to store the amount of hydrogen fuel provided through the liquid hydrogen delivery assembly in excess of the combustor fuel flowrate. The flowchart 500 subsequently includes at (515) providing hydrogen fuel from the buffer tank to the combustor at the combustor fuel flowrate. Notably, a combustor pressure (513) may influence the pressure at which the hydrogen fuel is provided to the combustor from the buffer tank and is received by the buffer tank module (512).

Further, if an internal pressure of the buffer tank exceeds an upper threshold, as determined by the flowchart at (514) using a buffer tank pressure (516) determined, e.g., by a buffer tank pressure sensor or other sensor configured to sense data indicative of an internal pressure of the buffer tank, the flowchart 500 includes at (518) venting at least a portion of the hydrogen fuel within the buffer tank, e.g., to an ambient location, such as to atmosphere.

Referring back to the query at step (508), if the combustor fuel flowrate is greater than the minimum amount of liquid hydrogen that may be provided through the liquid hydrogen delivery assembly (i.e., if the answer to step (508) is yes), then the flowchart 500 further determines at (520) if the combustor fuel flowrate is greater than the minimum amount of hydrogen fuel that may be provided by the liquid hydrogen delivery assembly plus an amount of hydrogen fuel, or rather gaseous hydrogen fuel, that may be provided from the buffer tank. Such may include determining if a stored amount of hydrogen fuel within the buffer tank is greater than a difference between the minimum amount of hydrogen fuel that may be provided by the liquid hydrogen delivery assembly and the combustor fuel flowrate.

If the answer to the query at step (520) is no, meaning the stored amount of hydrogen fuel in the buffer tank is greater than the difference between the minimum amount of hydrogen fuel that may be provided by the liquid hydrogen delivery assembly and the combustor fuel flowrate, then the flowchart 500 provides a signal to the buffer tank control module (512) to command the buffer tank module to provide the minimum amount of hydrogen fuel from the liquid hydrogen delivery assembly plus the difference between the combustor fuel flowrate and the minimum amount of hydrogen fuel from the buffer tank. The flowchart 500 subsequently includes at (515) providing hydrogen fuel from the buffer tank to the combustor at the combustor fuel flowrate. Such may allow for hydrogen fuel to be provided to the combustor at the combustor fuel flowrate relatively quickly.

If the answer to the query at step (520) is yes, then the flowchart 500 then determines at (522) if the combustor fuel flowrate is greater than a maximum amount of hydrogen fuel that may be provided through the liquid hydrogen delivery assembly by the pump (e.g., a maximum pump capacity) and an available amount of hydrogen fuel within the buffer tank. If the answer to the query at step (522) is no, meaning the liquid hydrogen delivery assembly, or rather the pump, can provide hydrogen fuel at the combustor fuel flowrate (optionally with the assistance from stored hydrogen fuel in the buffer tank), then the flowchart 500 includes at (524) sending a signal to the pump of the liquid hydrogen delivery assembly to increase the flow of liquid hydrogen fuel from the liquid hydrogen fuel tank through the liquid hydrogen delivery assembly, at (526) providing the fuel from the liquid hydrogen delivery assembly to the buffer tank, and subsequently providing a signal to the buffer tank control module (512) to command the buffer tank module to provide hydrogen fuel at the combustor fuel flowrate from the buffer tank. The flowchart 500 subsequently includes at (515) providing hydrogen fuel from the buffer tank to the combustor at the combustor fuel flowrate.

However, if the answer to the query at step (520) is yes, the flowchart 500 may utilize the gaseous hydrogen delivery assembly and gaseous hydrogen fuel tank to provide the supplemental/excess hydrogen fuel needed. More specifically, for the exemplary aspect of the flowchart 500 depicted in FIG. 8, if the answer to the query at step (520) is yes, meaning the liquid hydrogen delivery assembly, or rather the pump, cannot provide hydrogen fuel at the combustor fuel flowrate even with the assistance from stored hydrogen fuel in the buffer tank, the flowchart includes at (528) providing a signal to the gaseous hydrogen delivery assembly to provide gaseous hydrogen fuel, e.g., from the gaseous hydrogen fuel tank (and/or the boil off assembly), to the buffer tank. The amount of gaseous hydrogen fuel provided at (528) may be a difference between the maximum amount of hydrogen fuel that may be provided through the liquid hydrogen delivery assembly by the pump and the combustor fuel flowrate.

The flowchart 500 further includes at (530) providing the gaseous hydrogen fuel from the gaseous hydrogen delivery assembly to the buffer tank. The buffer tank module at (512) may then send a signal to the buffer tank to provide hydrogen fuel at the combustor fuel flowrate to the combustor from the buffer tank. The flowchart 500 subsequently includes at (515) providing hydrogen fuel from the buffer tank to the combustor at the combustor fuel flowrate.

In such a manner, it will be appreciated that a fuel system operated in accordance with the flow chart 500 depicted in FIG. 8 and described above with reference thereto may allow for substantially all of a necessary amount of hydrogen fuel for a substantial portion of a gas turbine engine flight plan to be provided from a liquid hydrogen delivery assembly, with excess amounts for certain high power operating conditions (e.g., a takeoff operating condition or climb operating condition) to be provided from a gaseous hydrogen delivery assembly. Such may allow for a majority of the hydrogen fuel necessary to complete a flight plan to be stored in a liquid phase, allowing for more compact storage of the hydrogen fuel, while also allowing for the fuel tanks holding such majority of the hydrogen fuel to operate with a relatively low internal pressure. Further, the fuel system operated in accordance with the system depicted in FIG. 8 and described with reference thereto may allow for relatively quick changes in fuel delivery to the combustor by utilizing hydrogen fuel stored in the buffer tank in the gaseous phase. Such may allow for relatively quick increases and decreases in fuel flow to the combustor, even while providing the fuel flow to the combustor through the liquid hydrogen delivery assembly. Such may also allow for providing hydrogen fuel to the combustor at a flow rate below a flow rate associated with the minimum amount of hydrogen fuel that may be provided by the liquid hydrogen delivery assembly.

Figure 9:
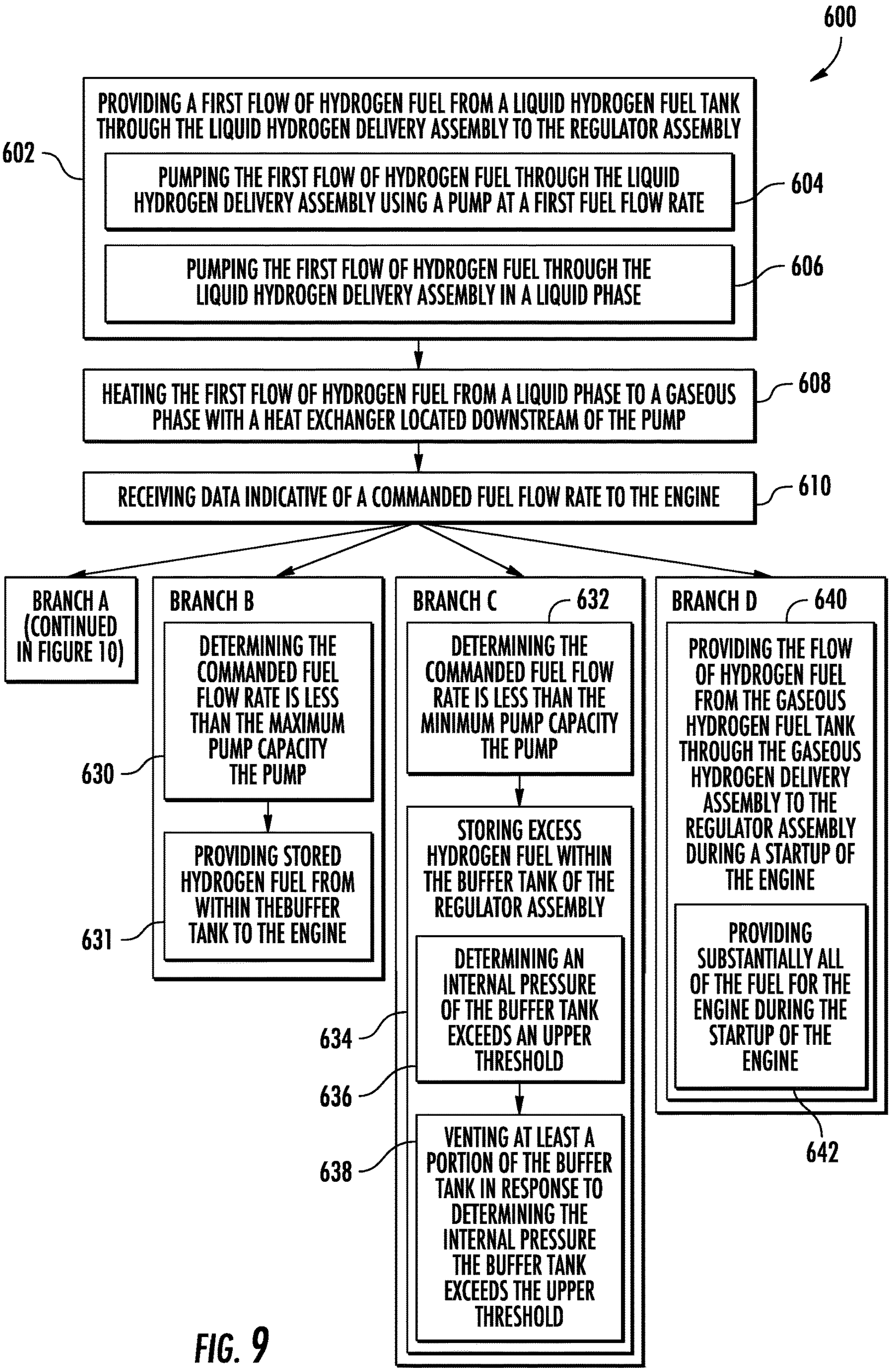
FIG. 9 is a flow diagram of a method for operating a fuel system in accordance with an exemplary aspect of the present disclosure.

Referring now to FIG. 9, a flow diagram of a method 600 of operating a fuel system for a vehicle having an engine is provided. The exemplary aspect of the method 600 depicted in FIG. 9 may be utilized to operate one or more of the exemplary fuel systems described above with reference to FIGS. 1 through 8. Accordingly, it will be appreciated that in the least certain exemplary aspects, the method 600 may be utilized with a fuel system for a vehicle having an engine, with the fuel system including a fuel delivery system. The fuel delivery system may generally include a liquid hydrogen delivery assembly, a gaseous hydrogen delivery assembly, and a regulator assembly having a buffer tank.

However, in other exemplary aspects, the method 600 may operate any other suitable fuel system for any other suitable vehicle and/or engine.

The method 600 includes at (602) providing a first flow of hydrogen fuel from a liquid hydrogen fuel tank through the liquid hydrogen delivery assembly to the regulator assembly. For the exemplary aspect depicted, providing the first flow of hydrogen fuel at (602) includes at (604) pumping the first flow of hydrogen fuel through the liquid hydrogen delivery assembly using a pump at a first fuel flowrate. More specifically, pumping the first flow of hydrogen fuel through the liquid hydrogen delivery assembly (604) includes at (606) pumping the first flow of hydrogen fuel through the liquid hydrogen delivery assembly in a liquid phase. Moreover, for the exemplary aspect depicted, providing the first flow of hydrogen fuel from the liquid hydrogen fuel tanks through the liquid hydrogen delivery assembly at (602) additionally includes at (608) heating the first flow of hydrogen fuel from a liquid phase to a gaseous phase with a heat exchanger located downstream of the pump.

Referring still to FIG. 9, the method 600 includes at (610) receiving data indicative of a commanded fuel flowrate to the engine.

Figure 10:
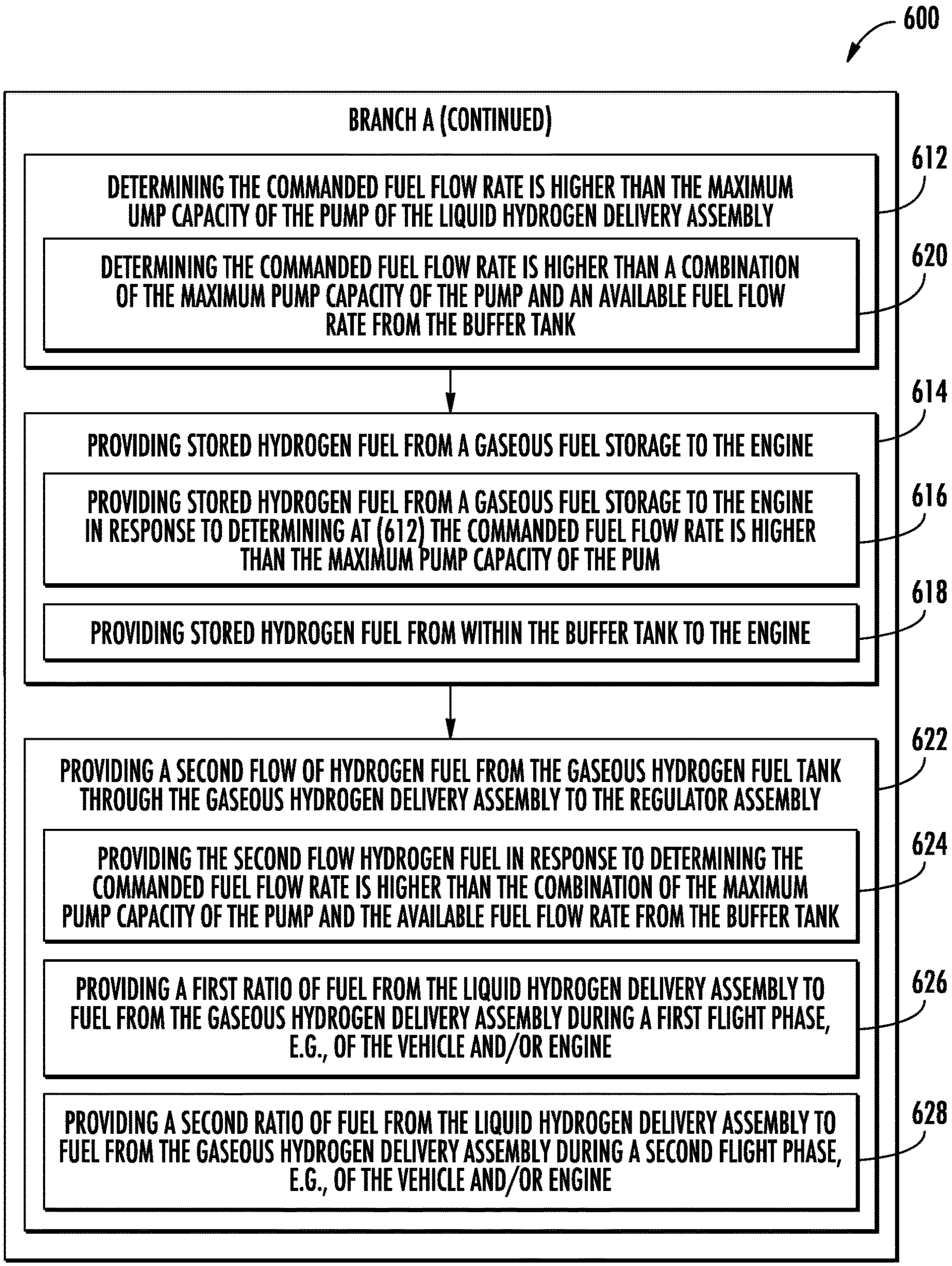
FIG. 10 is a flow diagram of a first branch of the method of FIG. 9 for operating a fuel system in accordance with an exemplary aspect of the present disclosure.

For a first branch of the method 600 depicted in FIG. 9 ("branch A"), depicted in greater detail in FIG. 10, the commanded fuel flowrate is higher than the first fuel flowrate. Such may indicate desired acceleration of the engine. More specifically, for the exemplary aspect depicted in FIGS. 9 and 10, the method 600 further includes at (612) determining the commanded fuel flowrate is higher than the maximum pump capacity of the pump of the liquid hydrogen delivery assembly.

As such, the method 600 further includes at (614) providing stored hydrogen fuel from a gaseous fuel storage to the engine. More specifically, for the exemplary aspect depicted, providing stored hydrogen fuel from the gaseous fuel storage to the engine at (614) includes at (616) providing stored hydrogen fuel from the gaseous fuel storage to the engine in response to determining at (612) the commanded fuel flowrate is higher than the maximum pump capacity of the pump.

As will be appreciated, the fuel storage may be, e.g., the buffer tank, the gaseous hydrogen fuel tank fluidly connected to the gaseous hydrogen delivery assembly, or both.

For example, in one exemplary aspect of the method 600 of FIG. 9, providing stored hydrogen fuel from the gaseous fuel tank to the engine at (614) includes at (618) providing stored hydrogen fuel from within the buffer tank to the engine. Depending on a size of the buffer tank, and an amount of hydrogen fuel stored therein, the buffer tank may provide for excess hydrogen fuel flow for a short duration of time, and/or for relatively small power increases exceeding what may be facilitated by the flow of hydrogen fuel provided from the pump of the liquid hydrogen delivery assembly.

In certain exemplary aspects of the method 600 depicted in FIG. 9, determining the commanded fuel flowrate is higher than the maximum pump capacity of pump at (612) further includes at (620) determining the commanded fuel flowrate is higher than a combination of the maximum pump capacity of the pump and an available fuel flowrate from the buffer tank. With such an exemplary aspect, the method 600 further includes at (622) providing a second flow of hydrogen fuel from the gaseous hydrogen fuel tank through the gaseous hydrogen delivery assembly to the regulator assembly. Providing the second flow of hydrogen fuel at (622) may include at (624) providing the second flow hydrogen fuel in response to determining the commanded fuel flowrate is higher than the combination of the maximum pump capacity of the pump and the available fuel flowrate from the buffer tank.

Notably, in at least certain exemplary aspects, the method 600 may not provide any appreciable additional hydrogen fuel from a stored amount within the buffer tank in response to determining the commanded fuel flowrate is higher than the maximum pump capacity the pump at (612), and instead, providing the second flow of hydrogen fuel from the gaseous hydrogen fuel tank through the gaseous hydrogen delivery assembly to the regulator assembly at (622) may be the primary (or only) source of hydrogen fuel in addition to the hydrogen fuel provided from the liquid hydrogen delivery assembly.

Further, it will be appreciated that for at least certain exemplary aspects, all hydrogen fuel provided to the engine is provided through the buffer tank (i.e., provided to the buffer tank and the buffer tank provides the desired amount/commanded amount to the engine). However, in other embodiments, there may be other flow arrangements that facilitate a desired hydrogen fuel flow to the engine. For example, in other embodiments, the gaseous hydrogen delivery assembly may extend in a parallel flow arrangement with the buffer tank to the engine. Other configurations are contemplated as well.

Referring still to the exemplary aspect of the method 600 depicted in FIGS. 9 and 10, in certain exemplary aspects, providing the flow of hydrogen fuel from the gaseous hydrogen fuel tank at (622) further includes at (626) providing a first ratio of fuel from the liquid hydrogen delivery assembly to fuel from the gaseous hydrogen delivery assembly during a first flight phase, e.g., of the vehicle and/or engine; and at (628) providing a second ratio of fuel from the liquid hydrogen delivery assembly to fuel from the gaseous hydrogen delivery assembly during a second flight phase, e.g., of the vehicle and/or engine.

The first ratio may be different than the second ratio, and in particular, the second ratio may be higher than the first ratio. For example, the first flight phase may be a higher power flight phase than the second flight phase. For example, the first flight phase may be a take-off or climb flight phase in the second flight phase may be a cruise flight phase. In such a manner, it will be appreciated that during at least certain exemplary aspects, the first ratio may be between about 2:1 and 1:10, such as less than about 1:1, such as less than about 1:2. The second ratio may be at least about 2:1 and up to about 1:0, such as at least about 4:1, such as at least about 8:1, such as at least about 10:1.

In such a manner, it will be appreciated that the method 600 is configured to provide a substantial portion, if not all, of the hydrogen fuel needed during a majority of a flight plan through the liquid hydrogen delivery assembly. However, during certain operations, such as high-power operations, additional supplemental hydrogen fuel may be provided through the gaseous hydrogen delivery assembly. Such may allow for the liquid hydrogen delivery assembly, and more specifically, the pump of the liquid hydrogen delivery assembly, to be designed to operate most efficiently during the majority of the flight phase (e.g., cruise).

Referring back particularly to the exemplary aspect of FIG. 9, the method 600 includes a second branch ("Branch B"), where the commanded fuel flow is less than the maximum pump capacity of the pump of the liquid hydrogen delivery assembly. More specifically, the method 600 includes at (630) determining the commanded fuel flowrate is less than the maximum pump capacity the pump, and more specifically, less than a combination of the maximum pump capacity of and a capacity of the buffer tank. With such an exemplary aspect, the method 600 may include providing stored hydrogen fuel from a gaseous fuel storage to the engine, or more specifically includes at (631) providing stored hydrogen fuel from within the buffer tank to the engine. In such manner, the method 600 may react relatively quickly to a change in commanded fuel flowrate for the engine by relatively quickly providing the additional hydrogen fuel from the buffer tank. ("Branch C") is provided where the commanded fuel flowrate is less than a minimum pump capacity of the pump. More specifically, with such an exemplary aspect, the method 600 further includes at (632) determining the commanded fuel flowrate is less than the minimum pump capacity the pump, and at (634) storing excess hydrogen fuel within the buffer tank of the regulator assembly. For example, as will be appreciated, the pump may define a turndown ratio that may prevent the pump from effectively operating below the minimum pump capacity.

Further, for the exemplary aspect of the method 600 depicted, storing excess hydrogen fuel within the buffer tank at (634) further includes at (636) determining an internal pressure of the buffer tank exceeds an upper threshold, and at (638) venting at least a portion of the buffer tank in response to determining the internal pressure the buffer tank exceeds the upper threshold. Such may allow for the fuel system to continue to provide hydrogen fuel to the engine through the liquid hydrogen delivery assembly from the liquid hydrogen fuel tank when the commanded fuel flowrate is lower than the minimum pump capacity of the pump, despite the buffer tank being at maximum capacity.

In yet another exemplary aspect of the method 600, a fourth branch ("Branch D") is provided depicting initial operations of the fuel system for the vehicle having the engine. As mentioned, the method 600 includes heating the first flow of hydrogen fuel from the liquid phase to the gaseous phase with the heat exchanger located downstream of the pump at (608). In certain exemplary aspects, the heat exchanger may be in thermal communication with an accessory system of the engine. However, prior to the engine operating, or prior to the engine operating at a certain threshold for a certain amount of time, the accessory system of the engine may not generate a sufficient amount of heat to heat the first flow of hydrogen fuel from the liquid phase to the gaseous phase. With such exemplary aspect, the method may include providing stored hydrogen fuel from a gaseous fuel storage to the engine (similar to (614)), or more specifically may include providing a flow of hydrogen fuel from the gaseous hydrogen delivery assembly to the regulator assembly, or more specifically, still, may include at (640) providing the flow of hydrogen fuel from the gaseous hydrogen fuel tank through the gaseous hydrogen delivery assembly to the regulator assembly during a startup of the engine. In at least certain exemplary aspects, providing the flow of hydrogen fuel at (640) may include at (642) providing substantially all of the fuel for the engine during the startup of the engine from the gaseous hydrogen delivery assembly. In such a manner, the method 600 may utilize an engine heat exchanger as the heat exchanger for the liquid hydrogen delivery assembly, potentially providing for more efficient use of heat on the engine during operation of the engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

A fuel system for a vehicle having an engine, the fuel system comprising: a liquid hydrogen fuel tank for holding a first portion of hydrogen fuel in a liquid phase; a gaseous hydrogen fuel tank for holding a second portion of hydrogen fuel in a gaseous phase; and a fuel delivery assembly comprising a liquid hydrogen delivery assembly in fluid communication with the liquid hydrogen fuel tank, the liquid hydrogen delivery assembly comprising a pump for pumping, in the liquid phase, the first portion of hydrogen fuel through the liquid hydrogen delivery assembly; a gaseous hydrogen delivery assembly in fluid communication with the gaseous hydrogen fuel tank, the gaseous hydrogen delivery assembly extending in a parallel arrangement with the liquid hydrogen delivery assembly; and a regulator assembly in fluid communication with both the liquid hydrogen delivery assembly and the gaseous hydrogen delivery assembly for providing gaseous hydrogen fuel to the engine when installed in the vehicle.

The fuel system of one or more of these clauses, wherein the regulator assembly comprises a buffer tank in fluid communication with both the liquid hydrogen delivery assembly and the gaseous hydrogen delivery assembly for receiving gaseous hydrogen fuel from both the liquid hydrogen delivery assembly and the gaseous hydrogen delivery assembly.

The fuel system of one or more of these clauses, wherein the buffer tank defines a fluid inlet and a fluid outlet, and wherein the buffer tank is configured to vary a flowrate of the gaseous hydrogen fuel from the fluid inlet to the fluid outlet.

The fuel system of one or more of these clauses, wherein the buffer tank comprises an exhaust valve, wherein the buffer tank is configured to purge gaseous hydrogen fuel from within the buffer tank through the exhaust valve when an internal pressure of the buffer tank exceeds an upper threshold.

The fuel system of one or more of these clauses, wherein the liquid hydrogen delivery assembly further comprises a heat exchanger located downstream of the pump for converting the first portion of hydrogen fuel from the liquid phase to a gaseous phase.

The fuel system of one or more of these clauses, wherein the engine comprises an accessory system, and wherein the heat exchanger is in thermal communication with the accessory system of the engine when installed in the vehicle.

The fuel system of one or more of these clauses, wherein the liquid hydrogen fuel tank is configured to be maintained at a pressure greater than about one bar and less than about 10 bar, and wherein the gaseous hydrogen fuel tank is configured to be maintained at a pressure greater than about 100 bar and less than about 1,000 bar.

The fuel system of one or more of these clauses, wherein the liquid hydrogen fuel tank provides at least about 60% of a maximum fuel storage capacity for the fuel system, and wherein the gaseous hydrogen fuel tank provides at least about 5% of the maximum fuel storage capacity for the fuel system.

The fuel system of one or more of these clauses, wherein the fuel delivery assembly further comprises a boil-off tank in fluid communication with the liquid hydrogen fuel tank, and wherein the boil-off tank is further in fluid communication with the gaseous hydrogen delivery assembly.

The fuel system of one or more of these clauses, wherein the boil-off tank is configured to be maintained at a pressure of between about 100 bar and about 400 bar, and wherein the gaseous hydrogen fuel tank is configured to be maintained at a pressure greater than about 100 bar and less than about 1,000 bar.

The fuel system of one or more of these clauses, wherein the regulator assembly further comprises a regulator valve and a flowmeter, wherein the regulator valve is configured to regulate a flow of gaseous hydrogen fuel to the engine based at least in part on data received from the flowmeter.

The fuel system of one or more of these clauses, wherein the liquid hydrogen delivery assembly further comprises a heat exchanger located downstream of the pump, wherein the engine comprises a lubrication oil system and an exhaust section, wherein the heat exchanger is in thermal communication with both the lubrication oil system and the exhaust section during at least certain operations when installed in the vehicle.

The fuel system of one or more of these clauses, wherein the engine defines a first fuel usage rate during a high power operating condition, and wherein the pump defines a maximum pump capacity less than the first fuel usage rate.

The fuel system of one or more of these clauses, wherein the pump is a primary pump for the liquid hydrogen delivery assembly, and wherein the maximum pump capacity of the pump is less than 75% of the first fuel usage rate.

The fuel system of one or more of these clauses, wherein the high power operating condition is a takeoff or climb operating condition.

The fuel system of one or more of these clauses, wherein the pump defines a turndown ratio of less than about 6:1.

The fuel system of one or more of these clauses, wherein the fuel delivery assembly is configured to provide substantially all of a commanded fuel flowrate for starting the engine from the gaseous hydrogen fuel tank through the gaseous hydrogen delivery assembly.

A propulsion system for a vehicle, the propulsion system comprising: an engine; and a fuel system for providing hydrogen fuel to the engine comprising a liquid hydrogen fuel tank for holding a first portion of hydrogen fuel in a liquid phase, a gaseous hydrogen fuel tank for holding a second portion of hydrogen fuel in a gaseous phase, and a fuel delivery assembly, the fuel delivery assembly comprising a liquid hydrogen delivery assembly in fluid communication with the liquid hydrogen fuel tank, the liquid hydrogen delivery assembly comprising a pump for pumping, in the liquid phase, the first portion of hydrogen fuel through the liquid hydrogen delivery assembly; a gaseous hydrogen delivery assembly in fluid communication with the gaseous hydrogen fuel tank, the gaseous hydrogen delivery assembly extending in parallel with the liquid hydrogen delivery assembly; and a regulator assembly in fluid communication with both the liquid hydrogen delivery assembly and the gaseous hydrogen delivery assembly for providing gaseous hydrogen fuel to the engine when installed in the vehicle.

The propulsion system of one or more of these clauses, wherein the engine defines a first fuel usage rate during a high power operating condition wherein the pump defines a maximum pump capacity less than the first fuel usage rate.

The propulsion system of one or more of these clauses, wherein the pump is a primary pump for the liquid hydrogen delivery assembly, and wherein the maximum pump capacity of the pump is less than 75% of the first fuel usage rate.

A method of operating a fuel system for a vehicle having an engine, the fuel system comprising a fuel delivery system, the fuel delivery system comprising a liquid hydrogen delivery assembly and a regulator assembly, the regulator assembly having a buffer tank, the method comprising: providing a first flow of hydrogen fuel from a liquid hydrogen fuel tank through the liquid hydrogen delivery assembly to the regulator assembly, wherein providing the first flow of hydrogen fuel comprises pumping the first flow of hydrogen fuel through the liquid hydrogen delivery assembly using a pump at a first fuel flowrate; receiving data indicative of a commanded fuel flowrate to the engine, wherein the commanded fuel flowrate is higher than the first fuel flowrate; and providing stored hydrogen fuel from a gaseous fuel storage to the engine.

The method of one or more of these clauses, further comprising: determining the commanded fuel flowrate is higher than a maximum pump capacity of the pump.

The method of one or more of these clauses, wherein providing stored hydrogen fuel from the gaseous fuel storage to the engine comprises providing stored hydrogen fuel from the gaseous fuel storage to the engine in response to determining the commanded fuel flowrate is higher than the maximum pump capacity of the pump.

The method of one or more of these clauses, wherein providing stored hydrogen fuel from the gaseous fuel storage to the engine comprises providing stored hydrogen fuel from within the buffer tank to the engine.

The method of one or more of these clauses, wherein determining the commanded fuel flowrate is higher than the maximum pump capacity of the pump comprises determining the commanded fuel flowrate is higher than a combination of the maximum pump capacity of the pump and an available fuel flowrate from the buffer tank, and wherein the method further comprises: providing a second flow of hydrogen fuel from a gaseous hydrogen fuel tank through a gaseous hydrogen delivery assembly of the fuel delivery assembly to the regulator assembly in response to determining the commanded fuel flowrate is higher than the combination of the maximum pump capacity of the pump and the available fuel flowrate from the buffer tank.

The method of one or more of these clauses, wherein the commanded fuel flowrate is less than a maximum pump capacity of the pump, and wherein providing stored hydrogen fuel from the gaseous fuel storage to the engine comprises providing stored hydrogen fuel from within the buffer tank to the engine.

The method of one or more of these clauses, wherein providing stored hydrogen fuel from the gaseous fuel storage to the engine comprises providing a second flow of hydrogen fuel from a gaseous hydrogen fuel tank through a gaseous hydrogen delivery assembly of the fuel delivery assembly to the regulator assembly.

The method of one or more of these clauses, wherein providing stored hydrogen fuel from the gaseous fuel storage to the engine comprises providing a flow of hydrogen fuel from a gaseous hydrogen fuel tank through a gaseous hydrogen delivery assembly of the fuel delivery assembly to the regulator assembly, and wherein providing the flow of hydrogen fuel from the gaseous hydrogen fuel tank through the gaseous hydrogen delivery assembly to the regulator assembly comprises: providing a first ratio of fuel from the liquid hydrogen delivery assembly to fuel from the gaseous hydrogen delivery assembly during a first flight phase; and providing a second ratio of fuel from the liquid hydrogen delivery assembly to fuel from the gaseous hydrogen delivery assembly during a second flight phase; wherein the second ratio is higher than the first ratio.

The method of one or more of these clauses, wherein the first flight phase is a takeoff or climb flight phase, and wherein the second flight phase is a cruise flight phase.

The method of one or more of these clauses, wherein the second ratio is at least 2:1 and up to 10:1.

The method of one or more of these clauses, wherein providing stored hydrogen fuel from the gaseous fuel storage to the engine comprises providing a flow of hydrogen fuel from a gaseous hydrogen fuel tank through a gaseous hydrogen delivery assembly of the fuel delivery assembly to the regulator assembly, and wherein providing the flow of hydrogen fuel from the gaseous hydrogen fuel tank through the gaseous hydrogen delivery assembly to the regulator assembly comprises providing the flow of hydrogen fuel from the gaseous hydrogen fuel tank through the gaseous hydrogen delivery assembly to the regulator assembly during a startup of the engine.

The method of one or more of these clauses, wherein providing the flow of hydrogen fuel from the gaseous hydrogen fuel tank through the gaseous hydrogen delivery assembly to the regulator assembly during the startup of the engine comprises providing substantially all of the fuel for the engine during the startup of the engine from the gaseous hydrogen delivery assembly.

The method of one or more of these clauses, further comprising: determining the commanded fuel flowrate is less than a minimum pump capacity of the pump; and storing excess hydrogen fuel within a buffer tank of the regulator assembly.

The method of one or more of these clauses, wherein storing excess hydrogen fuel within the buffer tank comprises: determining an internal pressure of the buffer tank exceeds an upper threshold; and venting at least a portion of the buffer tank in response to determining the internal pressure of the buffer tank exceeds the upper threshold.

The method of one or more of these clauses, wherein pumping the first flow of hydrogen fuel through the liquid hydrogen delivery assembly using the pump comprises pumping the first flow of hydrogen fuel through the liquid hydrogen delivery assembly in a liquid phase.

The method of one or more of these clauses, wherein providing the first flow of hydrogen fuel from the liquid hydrogen fuel tank through the liquid hydrogen delivery assembly to the regulator assembly comprises heating the first flow of hydrogen fuel from a liquid phase to a gaseous phase with a heat exchanger located downstream of the pump.

A fuel system for a vehicle having an engine, the fuel system comprising: a hydrogen fuel tank for holding a hydrogen fuel; and a fuel delivery assembly comprising a hydrogen delivery assembly in fluid communication with the hydrogen fuel tank; and a regulator assembly in fluid communication with the hydrogen delivery assembly for providing gaseous hydrogen fuel to the engine when installed in the vehicle, the regulator assembly comprising a buffer tank defining a fluid inlet and a fluid outlet, the buffer tank configured to vary a flowrate of the fuel from the fluid inlet to the fluid outlet.

The fuel system of one or more of these clauses, wherein the buffer tank comprises an exhaust valve, wherein the buffer tank is configured to purge gaseous hydrogen fuel from within the buffer tank through the exhaust valve when an internal pressure of the buffer tank exceeds an upper threshold.

The fuel system of one or more of these clauses, wherein the hydrogen fuel tank is a liquid hydrogen fuel tank, wherein the hydrogen fuel is a first portion of hydrogen fuel in a liquid phase, wherein the hydrogen delivery assembly is a liquid hydrogen delivery assembly, and wherein the fuel system further comprises: a gaseous hydrogen fuel tank for holding a second portion of hydrogen fuel in a gaseous phase; wherein the fuel delivery assembly further comprises a gaseous hydrogen delivery assembly in fluid communication with the gaseous hydrogen fuel tank, the gaseous hydrogen delivery assembly extending in parallel with the liquid hydrogen delivery assembly.

The fuel system of one or more of these clauses, wherein the buffer tank is in fluid communication with both the liquid hydrogen delivery assembly and the gaseous hydrogen delivery assembly for receiving hydrogen fuel from both the liquid hydrogen delivery assembly and the gaseous hydrogen delivery assembly.

The invention claimed is:

1. A fuel system for a vehicle having an engine, the fuel system comprising:

- a liquid hydrogen fuel tank for holding a first portion of hydrogen fuel in a liquid phase;
- a gaseous hydrogen fuel tank for holding a second portion of hydrogen fuel in a gaseous phase; and
- a fuel delivery assembly comprising:
  - a liquid hydrogen delivery assembly in fluid communication with the liquid hydrogen fuel tank, the liquid hydrogen delivery assembly comprising a pump for pumping, in the liquid phase, the first portion of hydrogen fuel through the liquid hydrogen delivery assembly;
  - a gaseous hydrogen delivery assembly in fluid communication with the gaseous hydrogen fuel tank, the gaseous hydrogen delivery assembly extending in a parallel arrangement with the liquid hydrogen delivery assembly, wherein the gaseous hydrogen delivery assembly includes a three-way boil-off valve defining a first input in fluid communication with the gaseous hydrogen fuel tank, a second input in fluid communication with a boil-off fuel assembly, and an output, the three-way boil-off valve to at least one of combine or alternate flows from the first input and the second input to a flow of gaseous hydrogen fuel through the output; and
  - a regulator assembly in fluid communication with both the liquid hydrogen delivery assembly and the outlet of the three-way boil-off valve of the gaseous hydrogen delivery assembly, the regulator assembly for providing gaseous hydrogen fuel to the engine when installed in the vehicle, wherein the regulator assembly includes a buffer tank in fluid communication with both the liquid hydrogen delivery assembly and the gaseous hydrogen delivery assembly for receiving gaseous hydrogen fuel from both the liquid hydrogen delivery assembly and the gaseous hydrogen delivery assembly,
  - wherein the buffer tank defines a fluid inlet including an inlet valve, a fluid outlet including an outlet valve, an internal cavity, and an exhaust including an exhaust valve, and
  - wherein a controller is in operable communication with at least one of the inlet valve, the outlet valve, or the exhaust valve to control operation of the respective at least one of the inlet valve, the outlet valve, or the exhaust valve based on an input including a fuel flowrate.

2. The fuel system of claim 1, wherein the vehicle is an aircraft having a fuselage and a wing attached to the fuselage, and wherein the liquid hydrogen fuel tank is located in the wing of the aircraft.

3. The fuel system of claim 1, wherein the buffer tank is configured to vary a flowrate of the gaseous hydrogen fuel from the fluid inlet to the fluid outlet.

4. The fuel system of claim 3, wherein the buffer tank is configured to purge gaseous hydrogen fuel from within the buffer tank through the exhaust valve when an internal pressure of the buffer tank exceeds an upper threshold, wherein the inlet valve is configured to ensure the gaseous hydrogen fuel only flows into the internal cavity through the fluid inlet, wherein the outlet valve is a variable throughput valve configured to vary the flowrate of the gaseous hydrogen fuel from the fluid inlet to the fluid outlet, and wherein the outlet valve is configured to be controlled based on a pressure difference between the internal cavity and a downstream side of the fluid outlet.

5. The fuel system of claim 1, wherein the liquid hydrogen delivery assembly further comprises a heat exchanger located downstream of the pump for converting the first portion of hydrogen fuel from the liquid phase to a gaseous phase.

6. The fuel system of claim 5, wherein the engine comprises an accessory system, and wherein the heat exchanger is in thermal communication with the accessory system of the engine when installed in the vehicle.

7. The fuel system of claim 1, wherein the liquid hydrogen fuel tank is configured to be maintained at a pressure greater than one bar and less than 10 bar, and wherein the gaseous hydrogen fuel tank is configured to be maintained at a pressure greater than 100 bar and less than 1,000 bar.

8. The fuel system of claim 1, wherein the liquid hydrogen fuel tank provides at least 60% of a maximum fuel storage capacity for the fuel system, and wherein the gaseous hydrogen fuel tank provides at least 5% of the maximum fuel storage capacity for the fuel system.

9. The fuel system of claim 1, wherein the boil-off fuel assembly further comprises a boil-off tank in fluid communication with the liquid hydrogen fuel tank, and wherein the boil-off tank is further in fluid communication with the second input of the three-way boil-off valve.

10. The fuel system of claim 9, wherein the boil-off tank is configured to be maintained at a pressure of between 100 bar and 400 bar, and wherein the gaseous hydrogen fuel tank is configured to be maintained at a pressure greater than 100 bar and less than 1,000 bar.

11. The fuel system of claim 1, wherein the regulator assembly further comprises a regulator valve and a flowmeter, wherein the regulator valve is configured to regulate a flow of gaseous hydrogen fuel to the engine based at least in part on data received from the flowmeter.

12. The fuel system of claim 1, wherein the liquid hydrogen delivery assembly further comprises a heat exchanger located downstream of the pump, wherein the engine comprises a lubrication oil system and an exhaust section, wherein the heat exchanger is in thermal communication with both the lubrication oil system and the exhaust section during at least certain operations when installed in the vehicle.

13. The fuel system of claim 1, wherein the engine defines a first fuel usage rate during a high power operating condition, and wherein the pump defines a maximum pump capacity less than the first fuel usage rate.

14. The fuel system of claim 13, wherein the pump is a primary pump for the liquid hydrogen delivery assembly, and wherein the maximum pump capacity of the pump is less than 75% of the first fuel usage rate.

15. The fuel system of claim 13, wherein the high power operating condition is a takeoff or climb operating condition.

16. The fuel system of claim 13, wherein the pump defines a turndown ratio of less than about 6:1.

17. The fuel system of claim 1, wherein the fuel delivery assembly is configured to provide substantially all of a commanded fuel flowrate for starting the engine from the gaseous hydrogen fuel tank through the gaseous hydrogen delivery assembly.

18. A propulsion system for a vehicle, the propulsion system comprising:

an engine; and a fuel system for providing hydrogen fuel to the engine comprising a liquid hydrogen fuel tank for holding a first portion of hydrogen fuel in a liquid phase, a gaseous hydrogen fuel tank for holding a second portion of hydrogen fuel in a gaseous phase, and a fuel delivery assembly, the fuel delivery assembly comprising a liquid hydrogen delivery assembly in fluid communication with the liquid hydrogen fuel tank, the liquid hydrogen delivery assembly comprising a pump for pumping, in the liquid phase, the first portion of hydrogen fuel through the liquid hydrogen delivery assembly;

a gaseous hydrogen delivery assembly in fluid communication with the gaseous hydrogen fuel tank, the gaseous hydrogen delivery assembly extending in parallel with the liquid hydrogen delivery assembly, wherein the gaseous hydrogen delivery assembly includes a three-way boil-off valve defining a first input in fluid communication with the gaseous hydrogen fuel tank, a second input in fluid communication with a boil-off fuel assembly, and an output, the three-way boil-off valve to at least one of combine or alternate flows from the first input and the second input to a flow of gaseous hydrogen fuel through the output; and a regulator assembly in fluid communication with both the liquid hydrogen delivery assembly and the outlet of the three-way boil-off valve of the gaseous hydrogen delivery assembly, the regulator assembly for providing gaseous hydrogen fuel to the engine when installed in the vehicle, wherein the regulator assembly includes a buffer tank in fluid communication with both the liquid hydrogen delivery assembly and the gaseous hydrogen delivery assembly for receiving gaseous hydrogen fuel from both the liquid hydrogen delivery assembly and the gaseous hydrogen delivery assembly, wherein the buffer tank defines a fluid inlet including an inlet valve, a fluid outlet including an outlet valve, an internal cavity, and an exhaust including an exhaust valve, and wherein a controller is in operable communication with at least one of the inlet valve, the outlet valve, or the exhaust valve to control operation of the respective at least one of the inlet valve, the outlet valve, or the exhaust valve based on an input including a fuel flowrate.

19. The propulsion system of claim 18, wherein the engine defines a first fuel usage rate during a high power operating condition wherein the pump defines a maximum pump capacity less than the first fuel usage rate.

20. The propulsion system of claim 19, wherein the pump is a primary pump for the liquid hydrogen delivery assembly, and wherein the maximum pump capacity of the pump is less than 75% of the first fuel usage rate.

* * * * *